(12) United States Patent
Townson et al.

(10) Patent No.: US 9,162,641 B2
(45) Date of Patent: Oct. 20, 2015

(54) FRONT FASCIA OR GRILL SUPPORT STRUCTURE AND AERODYNAMIC SHUTTER ASSEMBLY

(71) Applicant: GM Global Technology Operations LLC, Detroit, MI (US)

(72) Inventors: James M. Townson, Clarkston, MI (US); Nicolay E. Vandercar, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/960,349

(22) Filed: Aug. 6, 2013

(65) Prior Publication Data

US 2014/0132033 A1    May 15, 2014

Related U.S. Application Data

(60) Provisional application No. 61/725,025, filed on Nov. 12, 2012.

(51) Int. Cl.
*B60R 19/52* (2006.01)
*B62D 25/08* (2006.01)
(Continued)

(52) U.S. Cl.
CPC .............. *B60R 19/52* (2013.01); *B60K 11/085* (2013.01); *B62D 25/084* (2013.01); *B62D 27/06* (2013.01); *B62D 35/005* (2013.01); *B62D 35/02* (2013.01)

(58) Field of Classification Search
CPC ...... B60R 19/52; B62D 25/084; B62D 27/06; B62D 35/005; B62D 35/02; B60K 11/085
USPC ............. 296/181.5, 193.09, 193.1, 187.09; 160/218; 293/115, 117; 180/68.6
IPC .......................................................... B60R 19/52
See application file for complete search history.

(56) References Cited

U.S. PATENT DOCUMENTS

| 5,628,536 A | 5/1997 | Fulkerson |
| 6,205,638 B1 | 3/2001 | Yustick |

(Continued)

FOREIGN PATENT DOCUMENTS

CN       101879917 A      11/2010

OTHER PUBLICATIONS

Office Action regarding related CN Application No. 201310559207.8; dated Jul. 3, 2015; 5 pages.

*Primary Examiner* — Pinel Romain
(74) *Attorney, Agent, or Firm* — Cantor Colburn LLP

(57) ABSTRACT

A fascia support structure and aerodynamic shutter assembly for a vehicle includes a fascia support structure, comprising: a top portion comprising a substantially U-shaped body comprising a top fascia support member, a first side fascia support member and a second side fascia support member, the first side fascia support member having a first side baffle, the second side fascia support member having a second side baffle; and a bottom portion comprising a bottom baffle, the bottom portion attached to the first and second side fascia support members, the top portion and the bottom portion comprising a fascia support structure opening, at least one of the first side baffle, second side baffle or bottom baffle having a seal member disposed on a leading edge. The assembly also includes an aerodynamic shutter system comprising a shutter frame having a shutter frame opening and a plurality of rotatable shutters disposed therein.

13 Claims, 17 Drawing Sheets

(51) Int. Cl.
  *B60K 11/08* (2006.01)
  *B62D 27/06* (2006.01)
  *B62D 35/00* (2006.01)
  *B62D 35/02* (2006.01)

(56) References Cited

U.S. PATENT DOCUMENTS

| | | | |
|---|---|---|---|
| 6,357,821 B1 | 3/2002 | Maj et al. | |
| 6,443,608 B1 | 9/2002 | Storck et al. | |
| 6,527,333 B2 * | 3/2003 | Hewitt et al. | 296/180.1 |
| 6,663,150 B1 | 12/2003 | Evans | |
| 6,736,434 B2 | 5/2004 | Anderson et al. | |
| 6,913,300 B2 | 7/2005 | Mori et al. | |
| 6,997,490 B2 | 2/2006 | Evans et al. | |
| 7,114,587 B2 | 10/2006 | Mori et al. | |
| 7,303,219 B2 | 12/2007 | Trabant et al. | |
| 7,438,348 B2 | 10/2008 | Nakamae et al. | |
| 7,766,111 B2 * | 8/2010 | Guilfoyle et al. | 180/68.1 |
| 7,896,409 B2 | 3/2011 | Abdelnour et al. | |
| 7,988,225 B2 | 8/2011 | Goldsberry | |
| 8,157,303 B2 | 4/2012 | Fortin | |
| 8,196,998 B2 * | 6/2012 | Ohno et al. | 296/193.09 |
| 8,807,895 B2 | 8/2014 | Brown | |
| 8,863,886 B2 | 10/2014 | O'Brien et al. | |
| 2002/0073529 A1 | 6/2002 | Yustick | |
| 2006/0102399 A1 | 5/2006 | Guilfoyle | |
| 2007/0182174 A1 | 8/2007 | Nakayama et al. | |
| 2008/0157566 A1 * | 7/2008 | Tazaki et al. | 296/193.1 |
| 2009/0267364 A1 | 10/2009 | Crainic et al. | |
| 2010/0243351 A1 * | 9/2010 | Sakai | 180/68.1 |
| 2010/0282438 A1 * | 11/2010 | Wirth et al. | 165/67 |
| 2012/0019025 A1 * | 1/2012 | Evans et al. | 296/193.1 |
| 2012/0110909 A1 * | 5/2012 | Crane et al. | 49/70 |
| 2013/0068403 A1 | 3/2013 | Fenchak et al. | 160/218 |
| 2013/0093210 A1 * | 4/2013 | Johnson | 296/181.5 |
| 2014/0059859 A1 | 3/2014 | Townson et al. | |
| 2014/0061407 A1 | 3/2014 | Townson et al. | |
| 2014/0062136 A1 | 3/2014 | Townson et al. | |
| 2014/0070564 A1 * | 3/2014 | Bernard | 296/180.3 |
| 2014/0191538 A1 | 7/2014 | Townson et al. | |
| 2014/0208602 A1 | 7/2014 | Townson et al. | |

* cited by examiner

FRONT FASCIA OR GRILL SUPPORT STRUCTURE AND AERODYNAMIC SHUTTER ASSEMBLY

CROSS-REFERENCES TO RELATED APPLICATIONS

This patent application claims priority to U.S. Provisional Patent Application Ser. No. 61/725,025 filed Nov. 12, 2012, which is incorporated herein by reference in its entirety.

FIELD OF THE INVENTION

The subject invention relates to vehicles and, more particularly to a front fascia support structure and for a vehicle having a seal member disposed thereon, and more particularly to a vehicle assembly comprising a positioning and reinforcement structure, a position-controlled front fascia support structure and an aerodynamic shutter system.

BACKGROUND

Vehicles, such as automobiles, are assembled by aligning and fastening numerous components and sub-assemblies to one another. One region of the automobile requiring assembly of such components and sub-assemblies is a 2 region. This portion of the vehicle is frequently assembled as an assembly or subassembly referred to as a "front clip." The front clip is commonly defined as the assembly comprising the portion of the vehicle extending from the A-pillar (the roof support pillar associated with the front windscreen) to the most forwardly disposed component, typically a front bumper. The front clip includes a structural frame, as well as a variety of vehicle components that collectively form the vehicle body.

Several efforts to directly or indirectly mount and/or fix the vehicle body components to each other, as well as to the vehicle frame, have relied on welded support structures or frames and machined body mounting locations for the body components. Approaches relying on such body mounting locations have undesirably led to large variations in alignment and fastening of components to each other. These large variations may influence the aesthetic appearance of the automobile to a user by providing nonuniform or undesirably large or small gaps and spacings between components and may be the cause of functional deficiencies, such as undesirable large opening/closing efforts, alignment and mutilation of components due to misalignment and interference, and non-uniform gaps and spacings, which each may affect consumer satisfaction.

One area of concern in the front clip has been the positioning of the front fascia and the grill opening therein. In addition, another area of concern has been the ability to create an efficient airflow path from the grill opening to the radiator and cooling system and into the engine compartment. These are very important due to their influence on vehicle fit and finish, aesthetic appeal and perceived vehicle quality, as well as their influence on and contribution to airflow over the vehicle and through the grill opening, which in turn affects the aerodynamic drag and drag coefficient of the vehicle and its vehicle fuel efficiency. For example, an inefficient airflow path and losses of the airflow through the grill and grill opening between the opening and the cooling system may affect the sizing of the grill opening (e.g. require a larger opening) and increase the drag coefficient. Controlling the airflow path can be particularly complicated when front fascias are employed, since they generally include many complex curved surfaces that make it difficult to define an efficient airflow path. This has generally been accomplished using various combinations of airflow closeouts and masticated rubber baffles which must in turn be incorporated into, and accurately positioned within, the front end clip. While these can be effective they add to cost and afford the opportunity for variability in position, which can affect variability in the efficiency of the airflow path and vehicle performance.

Accordingly, it is desirable to provide improved support and positioning of the front fascia and grill opening and to improve the efficiency of the airflow path and reduce airflow losses through the grill opening to improve vehicle fit, finish and performance.

SUMMARY OF THE INVENTION

In one exemplary embodiment, a fascia support structure and aerodynamic shutter assembly for a vehicle is disclosed. The assembly includes a fascia support structure, comprising: a top portion comprising a substantially U-shaped body, the U-shaped body comprising a top fascia support member, a first side fascia support member and a second side fascia support member, the first side fascia support member having a first side baffle, the second side fascia support member having a second side baffle; and a bottom portion comprising a bottom baffle, the bottom portion detachably attached to the first side fascia support member and the second side fascia support member, the top portion and the bottom portion comprising a fascia support structure opening, at least one of the first side baffle, second side baffle or bottom baffle having a seal member disposed on a leading edge thereof. The assembly also includes an aerodynamic shutter system comprising a shutter frame having a shutter frame opening and a plurality of rotatable shutters disposed therein to define a closable portion of the shutter frame opening and an open portion of the shutter frame opening, the shutter frame covering and detachably attached to the top portion and the bottom portion about a periphery of the fascia support structure opening, the shutters rotatable from a closed position where adjacent shutters are in overlapping engagement with one another to an open position where the shutters are not in overlapping engagement with one another.

In another exemplary embodiment, a position-controlled front fascia support structure assembly for a vehicle is disclosed. The assembly includes a positioning and reinforcement member for a front end clip of a vehicle, the positioning and reinforcement member comprising a plurality of first position reference features for locating and fixing the positions of a plurality of vehicle components comprising the front end clip, the positioning and reinforcement member comprising a positioning and reinforcement member opening. The assembly also includes a position-controlled front fascia support structure detachably attached to the positioning and reinforcement member and comprising a plurality of second position reference features that are configured for cooperative engagement with the first position reference features to locate and fix the front fascia support structure in a predetermined position relative to the positioning and reinforcement member, and also comprising: a top portion comprising a substantially U-shaped body, the U-shaped body comprising a top fascia support member, a first side fascia support member and a second side fascia support member, the first side fascia support member having a first side baffle, the second side fascia support member having a second side baffle, a second position reference feature of the top portion configured for cooperative engagement with at least one of the plurality of first position reference features to establish the predetermined position of the top portion relative to the positioning and reinforcement structure; and a bottom portion comprising a bottom baffle, the bottom portion attached to the first side fascia support member and the second side fascia support member, the top portion and the bottom portion comprising a fascia support structure opening, at least one of the first side baffle, second side baffle or bottom baffle having a seal member disposed on a leading edge thereof, a second position reference feature of the bottom portion configured for cooperative engagement with at least one of the plurality of first position reference features to establish the predetermined position of the bottom portion relative to the positioning and reinforcement structure. The assembly further includes an aerodynamic shutter system comprising a shutter frame having a shutter frame opening and a plurality of rotatable shutters disposed therein to define a closable portion of the shutter frame opening and an open portion of the shutter frame opening, the shutter frame covering and detachably attached to the top portion and the bottom portion about a periphery of the fascia support structure opening, the shutters rotatable from a closed position where adjacent shutters are in overlapping engagement with one another to an open position where the shutters are not in overlapping engagement with one another.

In yet another exemplary embodiment, a position-controlled front grill support structure assembly for a vehicle is disclosed. The assembly includes a positioning and reinforcement member for a front end clip of a vehicle, the positioning and reinforcement structure comprising a substantially cross-car extending and vertically extending member frame and defining a member frame opening. The assembly also includes a one-piece position-controlled front grill support structure that is sealingly and detachably attached to the positioning and reinforcement member, the front grill support structure comprising an attachment flange and a grill reinforcement rib extending outwardly away from the attachment flange in a forward direction, the grill reinforcement rib defining a front grill support structure opening, the attachment flange configured to sealingly engage a front surface of the positioning and reinforcement member. The assembly further includes an aerodynamic shutter system comprising a shutter frame having a shutter frame opening and a plurality of rotatable shutters disposed therein to define a closable portion of the shutter frame opening and an open portion of the shutter frame opening, the shutter frame having a front surface and a rear surface, the rear surface sealingly and detachably attached to the front grill support structure about a periphery of the grill support structure opening, the shutters rotatable from a closed position where adjacent shutters are in overlapping engagement with one another to an open position where the shutters are not in overlapping engagement with one another, the shutter frame opening, front grill support structure opening and member frame opening comprising a sealed airflow conduit for communication of an airflow.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
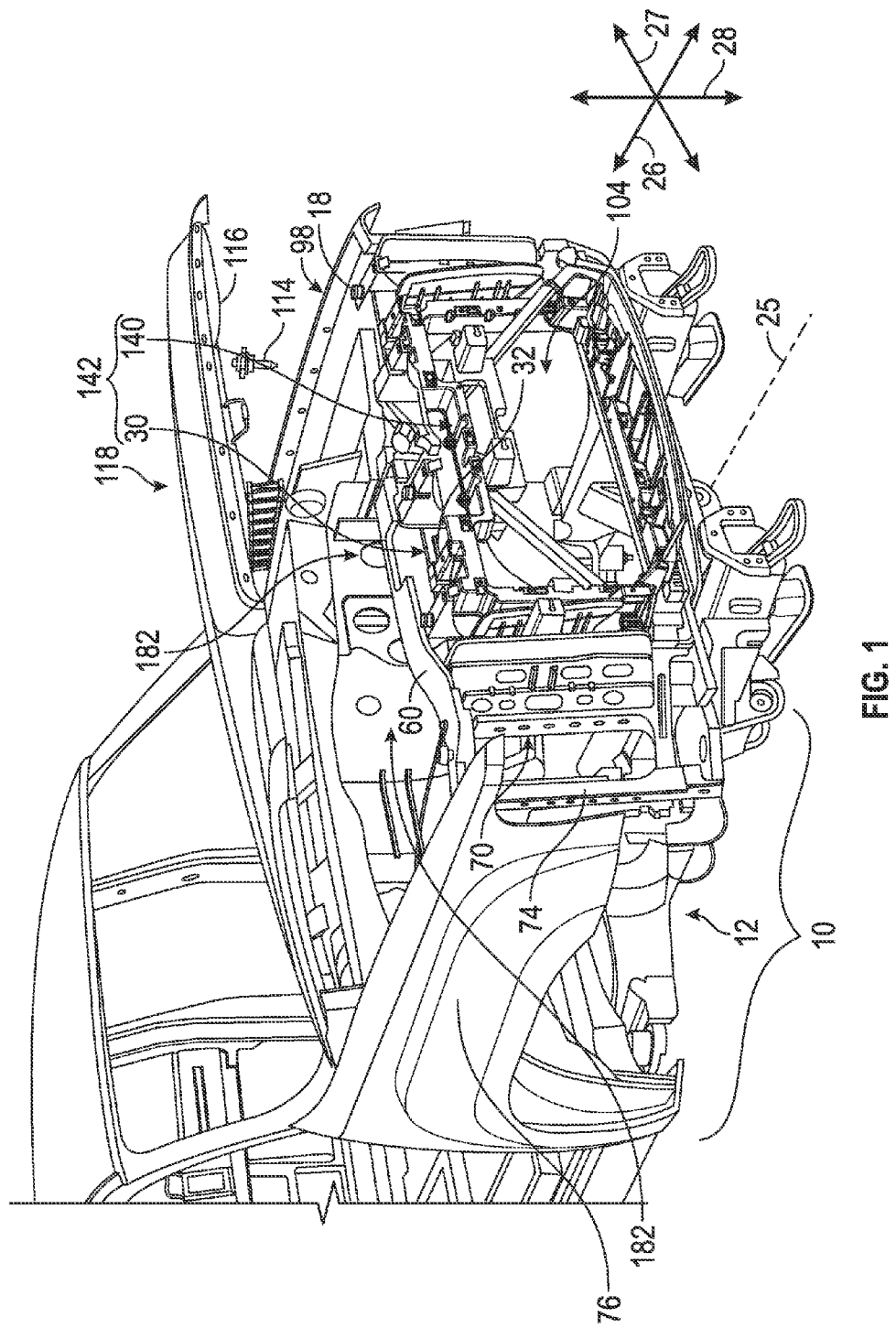
FIG. 1 is a perspective view of an exemplary embodiment of a front end assembly as disclosed herein.

The following description is merely exemplary in nature and is not intended to limit the present disclosure, its application or uses. It should be understood that throughout the drawings, corresponding reference numerals indicate like or corresponding parts and features.

Figure 9:
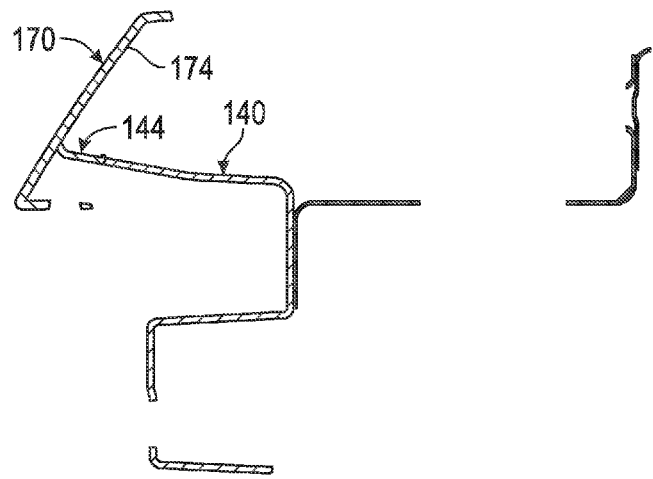
FIG. 9 is a schematic section view of the section 9-9 of FIG. 8.
Figure 10:
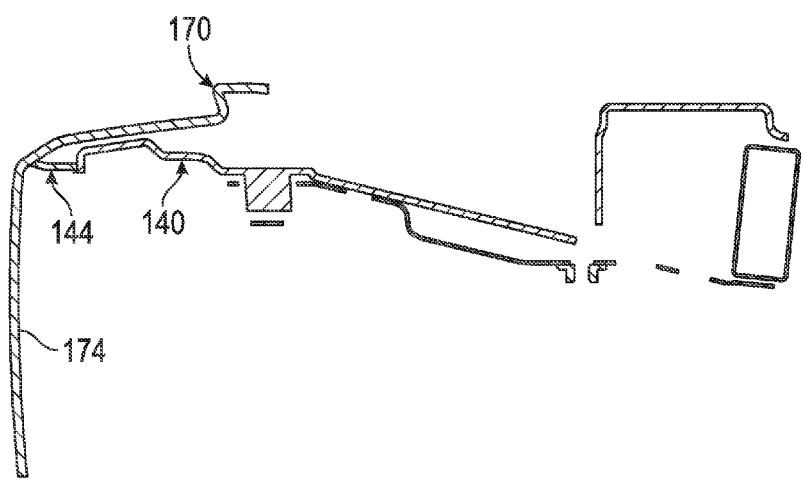
FIG. 10 is a schematic section view of the section 10-10 of FIG. 8.

Referring to FIGS. 1-15, a position-controlled front fascia support structure 140 is disclosed. The position-controlled front fascia support structure 140 may also be referred to herein interchangeably as a shutter body, as it also may be used to provide a support and attachment structure for an aerodynamic shutter system 190, as described further herein. The front fascia support structure 140 includes seal members 144 that may be integrally formed on leading edges thereof that are configured to seal against an inner or rearward facing surface 174 of a front fascia 170 to form an efficient airflow path 178 from the grill opening 172 to the radiator 180 and cooling system and into the engine compartment. The position-controlled front fascia support structure 140 is also assembled to a positioning and support member 30 using positioning features 132 and attachment features 134 that are formed on the structure and/or the member, as described herein. This provides a position-controlled front fascia support structure assembly 142 that enables precise and repeatable positioning of the front fascia 170 and the grill opening 172 therein, and that provides a very desirable vehicle fit and finish, aesthetic appeal and perceived vehicle quality. In addition, the position-controlled front fascia support structure assembly 142 provides an efficient, low-loss airflow path from the grill opening 172 to the radiator 180 and cooling system and into the engine compartment, including the engine air intake system. This is very advantageous as the efficient airflow path 178 improves the airflow 100 over the exterior surfaces of the vehicle and through the grill opening, which in turn reduces the aerodynamic drag and drag coefficient of the vehicle and increases the vehicle fuel efficiency. The position-controlled front fascia support structure 140 provides unique, integrally formed seal members 144 that incorporate dual-shot injection molding technology to facilitate a seal around the perimeter 173 of the grill opening 172 between the position-controlled front fascia support structure 140 and the front fascia 170. Sealing the airflow 100 entering the grill opening 172 reduces airflow 100 losses so that the airflow entering the opening is captured and directed through the radiator 180 with minimal losses, increases heat exchange efficiency, and reduces aerodynamic drag. The dual shot injection mold process used on the position-controlled front fascia support structure 140 includes forming a hard polymer substrate overmolded with a softer polymer seal member 144. The seal members 144 may include a rubberized or elastomeric material that acts as a seal barrier for aerodynamic drag reduction. The seal members 144 are designed with a specific predetermined interference with the front fascia 170 and predicted or predetermined deformed shape that minimizes placement or assembly efforts while maintaining the interference and contact of these components under potential build variations. The predetermined interference is illustrated, for example, in FIGS. 9 and 10, by the bending of the free ends of the seal members 144 against the rear surface 174 of the fascia 170 upon its assembly to the vehicle 12. The interference provides for the pressed engagement of the seal members 144 of the front fascia support structure 140 and the fascia 170 forming a seal between them. The seal members 144 are integrated along with the position-controlled front fascia support structure 140 and aerodynamic shutter system closeout panels and eliminate the need for various discrete adapters and baffles.

Aerodynamic drag reduction improves fuel economy and the increase in the channeled airflow through the engine heat exchangers improves engine cooling efficiency and longevity, thereby enhancing customer satisfaction, complexity reduction and de-proliferation of discrete or loose parts (which reduces part costs), improved fuel economy potential (PQ), improved heat exchanger efficiency (which improves vehicle performance and longevity)

The harder plastic base of the front fascia 170 is overmolded during a secondary tooling operation with a material such as a rubberized plastic or elastomer that is soft and pliable. The soft material is designed with draft to the primary separation direction of the mold tool used to form the front fascia support structure 140 and enables execution (e.g., molding) of two materials in the same mold tool using compatible molding methods, such as two-shot injection molding. Engineered interference of the soft-shot material of the seal members 144 to the front fascia 170 and grill (not shown) ensures an appropriate seal-out of air leaks that may otherwise result from air escaping around the typical gaps between the various members of the assembly and losses of airflow 100 that may occur without the use of seal members 144, and which is known to occur in conventional fascia assemblies that do not implement the invention described herein, particularly front fascia support structure 140 and seal members 144.

Referring to FIGS. 1-15, and more particularly to FIGS. 1-10, in an exemplary embodiment a front fascia support structure 140 for use in conjunction with a grill opening reinforcement (GOR) member 30 to provide a position-controlled front fascia support assembly 142 is disclosed. The position-controlled front fascia support assembly 142 may also be referred to interchangeably herein as a grill opening reinforcement (GOR) structure or assembly. Use of the front fascia support structure 140 in conjunction with the GOR member 30 may advantageously be used to establish a predetermined position of the front fascia 170 and grill opening 172 in an optimal predetermined position and provides a built-in device to establish the optimal position of the front fascia 170 and grill opening 172 relative to other front end components, such as the frame 14, front hood 118 and front fenders 76, 98 and provide a desired combination of the proper function of the grill opening 172 and an aesthetic appearance of the front fascia 170 relative to the other components that comprise the front end assembly 10. The position-controlled front fascia support assembly 142, and particularly the front fascia support structure 140, also serves to define a sealed air channel or passageway for an airflow 100 that extends from the grill opening 172 in the front fascia 170 to the cooling system, including the radiator 180, and into the engine compartment 182.

Referring to FIGS. 1-15, in accordance with an exemplary embodiment of the invention, a portion of a front end assembly 10 of a vehicle 12 is shown in the form of an automobile. Although the vehicle 12 is illustrated as passenger vehicle or automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. In one embodiment, the fascia support is particularly useful in conjunction with an SUV, or a family of SUVs built using a substantially similar vehicle platform, wherein the front fascia 170, grill opening 172 therein and grill (not shown) that partially encloses the grill opening are used to differentiate various members of the family of SUVs associated with different vehicle brands, for example. The preceding list is merely illustrative and is not intended to be limiting of the numerous automobile or vehicle types that may benefit from the embodiments of the invention.

The vehicle 12 includes a frame 14 formed of several integrally formed or operably coupled components that connect them to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending forward from what is known conventionally as an "A-pillar" to a forwardmost component, such as a front fascia 170. The front end assembly 10 may be interchangeably referred to as a "front clip" of the vehicle 12.

To facilitate assembly of the front end assembly 10, both with respect to components in relation to each other as well as to the frame 14, a positioning and reinforcement member 30 is included. The positioning and reinforcement member 30 generally refers to a structure configured to provide a foundation for inter-part dimensional relationships during the assembly process for all components of the front end assembly 10, thereby alleviating reliance on a front clip frame and individual machined mounting locations. In one embodiment, the positioning and reinforcement member 30 comprises a grill opening reinforcement (GOR) structure that acts to define and reinforce a grill opening 172. Since the positioning and reinforcement member 30 may be formed as an assembly, it may also be referred to herein as a positioning and reinforcement member assembly 30 or a GOR member assembly. As will be described in detail below, the positioning and reinforcement member 30 and the position-controlled front fascia support structure 140 include various locators, fastening features, and other critical dimensional relationship interfaces of several components and sub-assemblies. This may include any component and/or assembly/sub-assembly suitable for use in a front end assembly 10 or front clip, particularly fender assemblies 76, 98, headlamps (not shown), grill (not shown), front fascia 170, hood 118, hood latch (not shown), hood bumpers 18 and radiator support 60, for example. It is to be understood that the preceding list is merely illustrative of the numerous components and sub-assemblies which may be included in the front end assembly 10 and may benefit from the positioning and reinforcement member 30. Exemplary components and sub-assemblies will be described in detail below. As used herein, an axial direction 26 refers to a direction that extends frontward and rearward along an along a central axis 25 of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 4:
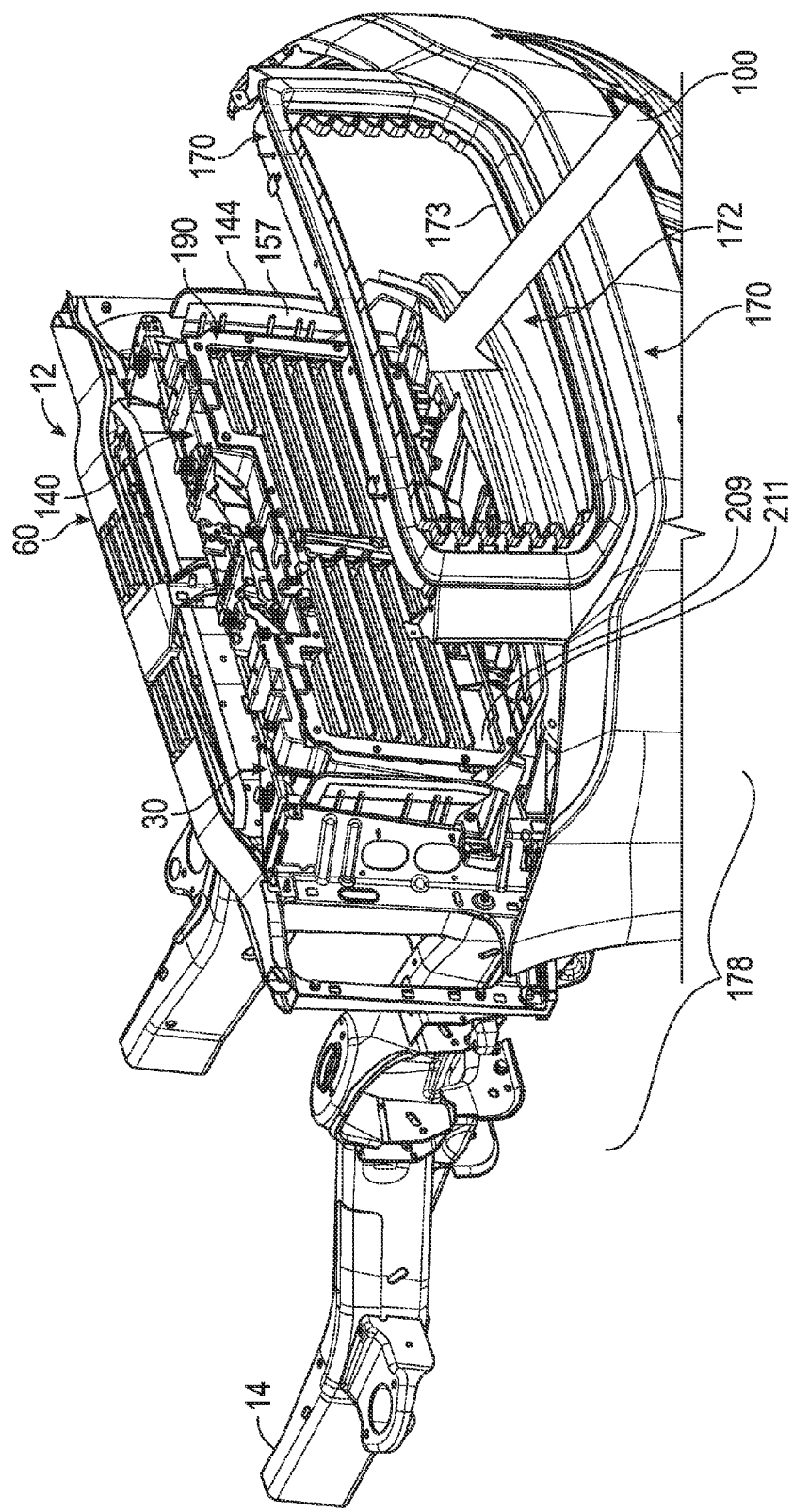
FIG. 4 is a perspective view of the position-controlled front fascia support structure assembly of FIG. 3 and a fascia that is not yet assembled thereto.
Figure 5:
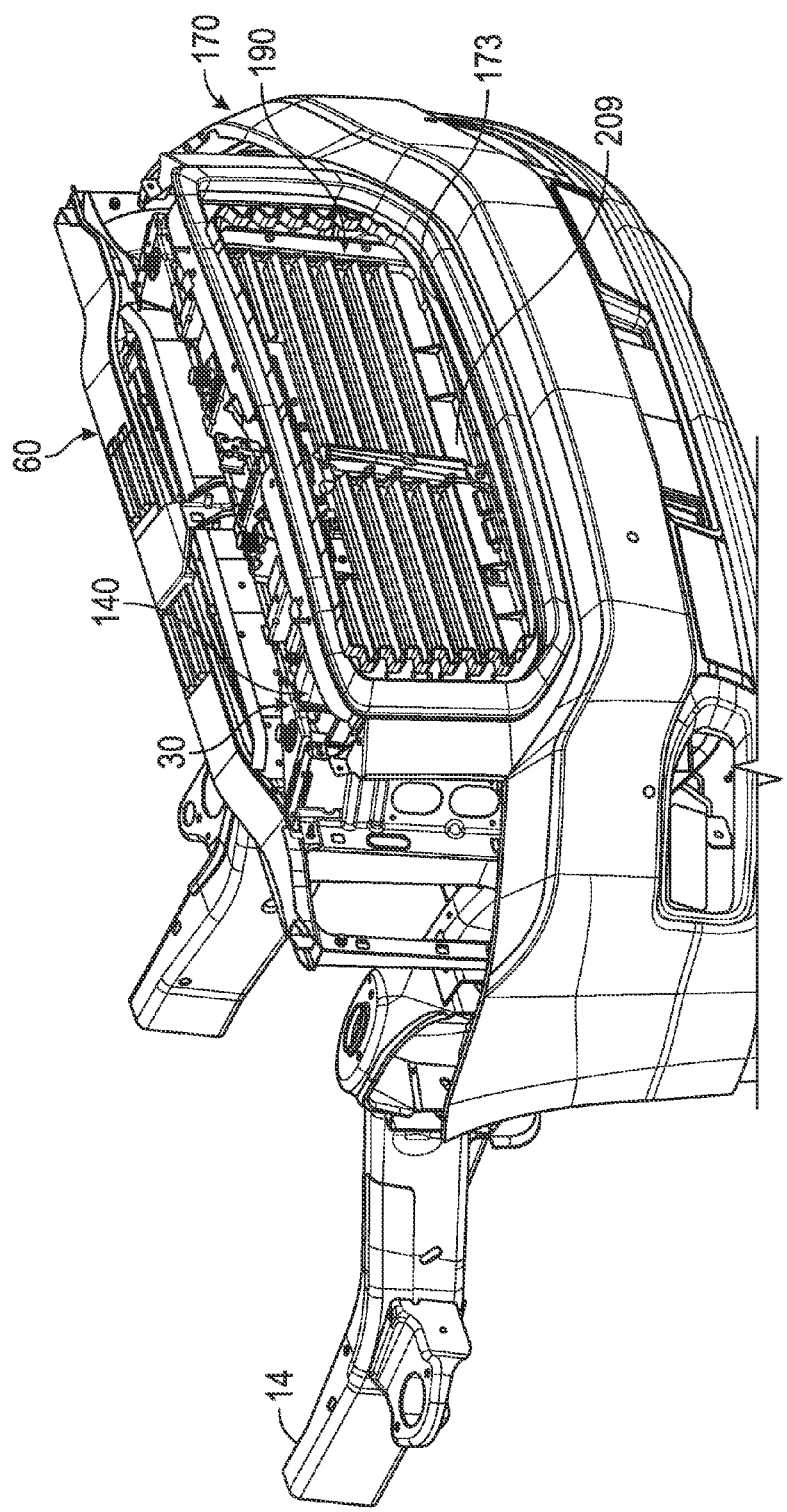
FIG. 5 is a perspective view of the position-controlled front fascia support structure assembly of FIG. 4 having the fascia assembled thereto.
Figure 6:
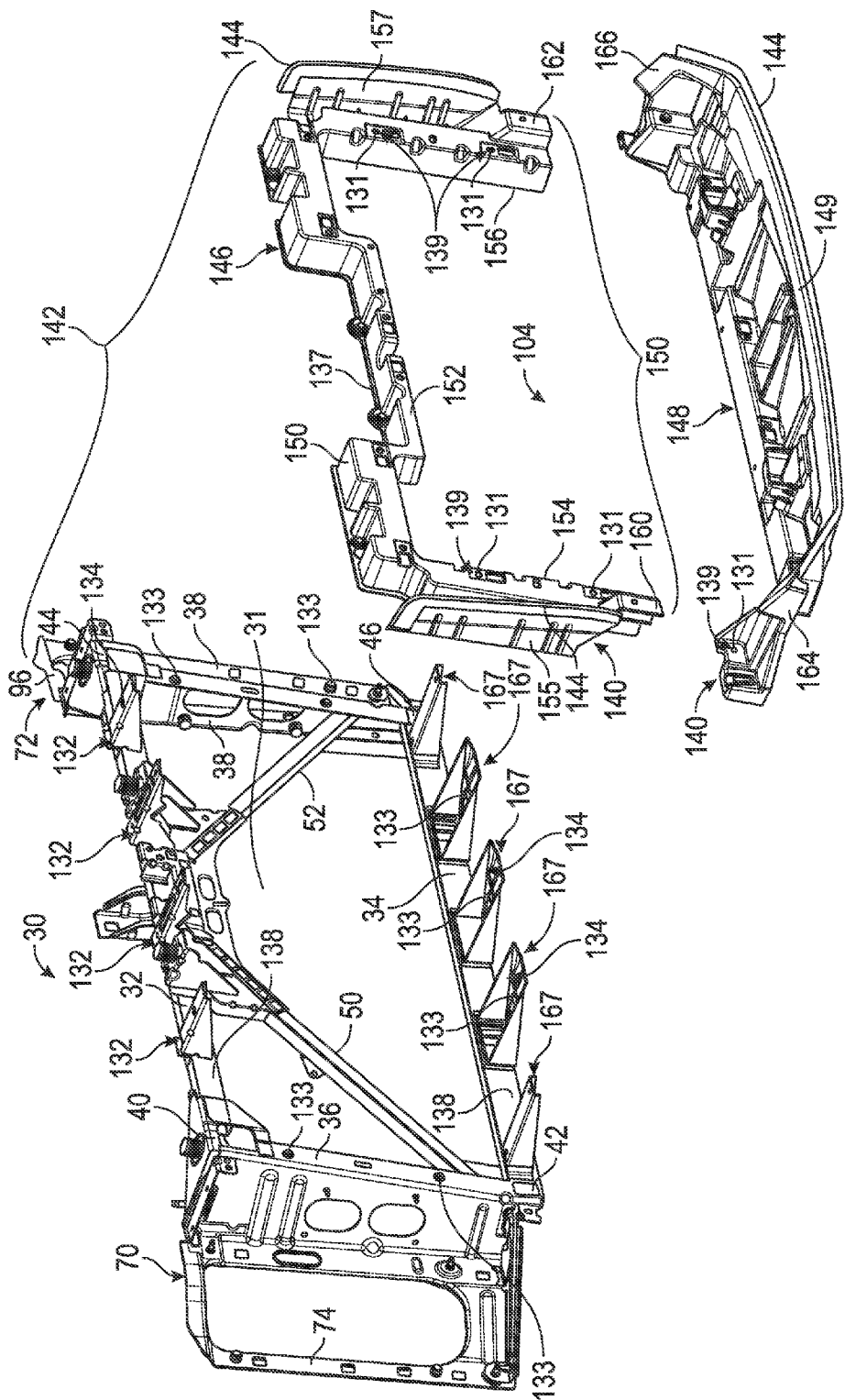
FIG. 6 is a partially disassembled perspective view of an embodiment of a positioning and support structure assembly as disclosed herein, including an exemplary embodiment of a positioning and support member and front fascia support structure as disclosed herein.
Figure 7:
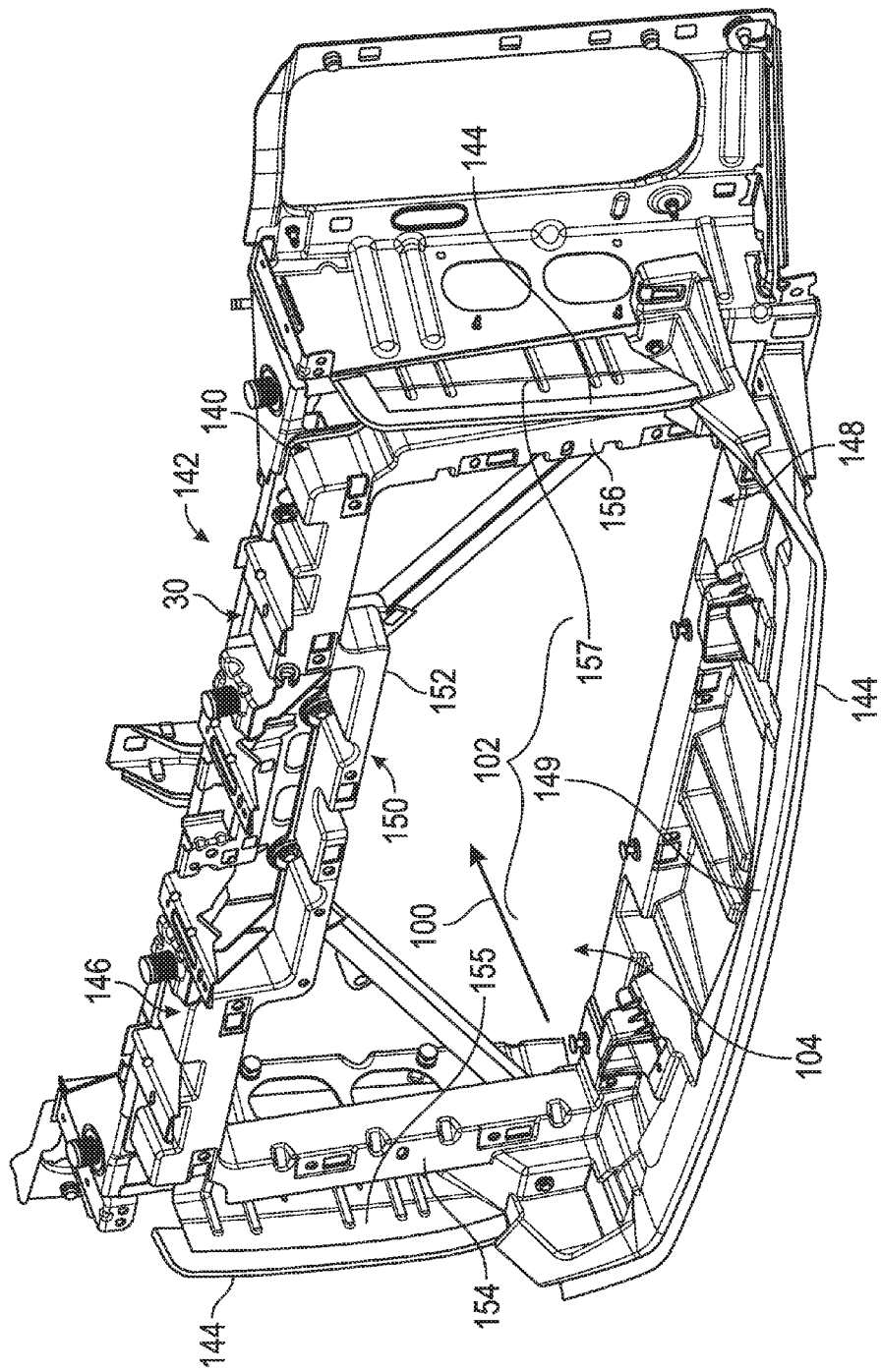
FIG. 7 is a perspective view of a position-controlled front fascia support structure assembly.
Figure 8:
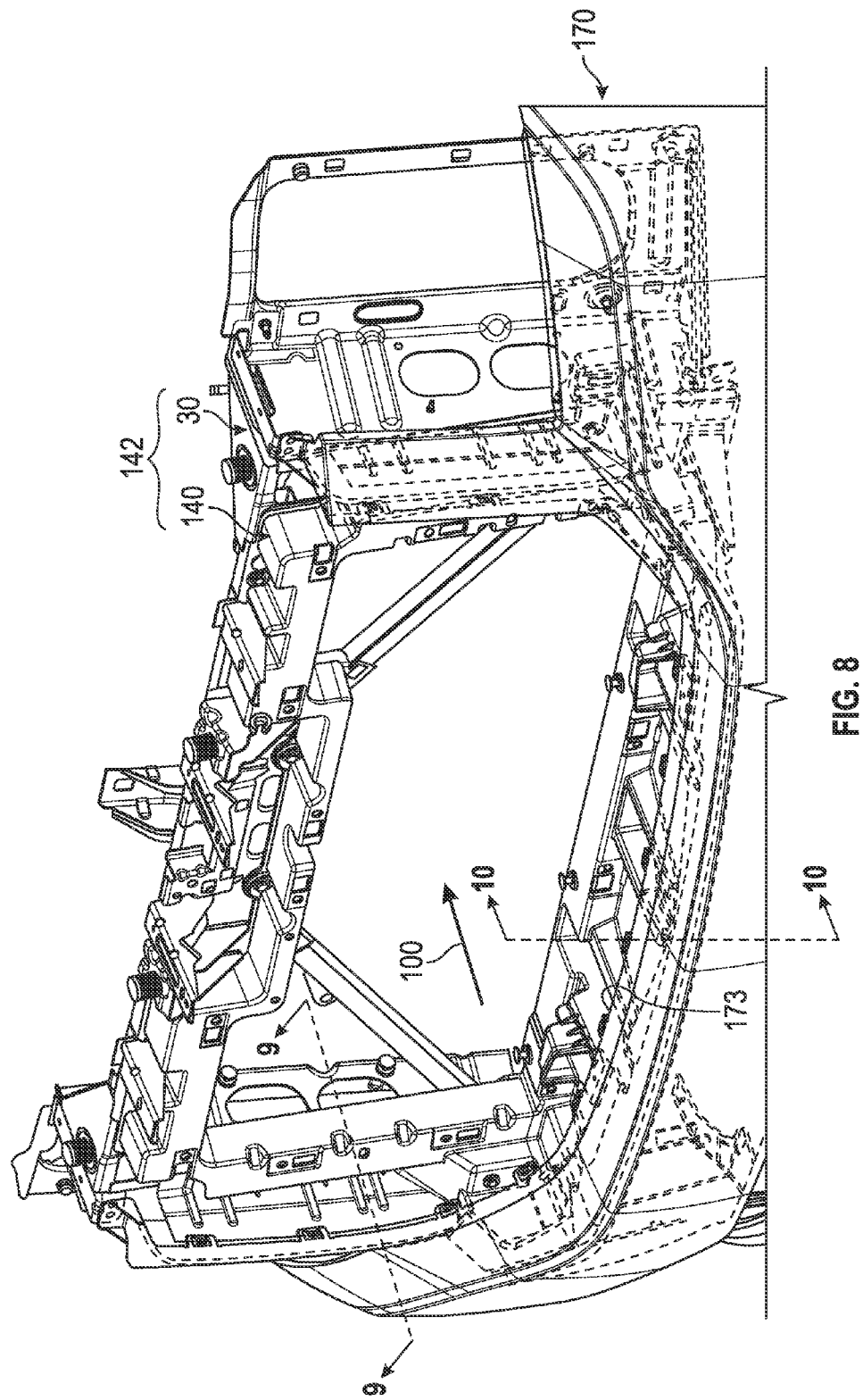
FIG. 8 is a perspective view of the position-controlled front fascia support structure assembly of FIG. 7 further comprising a front fascia disposed thereon.

Referring now to FIGS. 1-8, and particularly FIG. 6, the positioning and reinforcement member 30 is illustrated in greater detail. The positioning and reinforcement member 30 includes a rectilinearly situated geometry defined by a top support member 32, a bottom support member 34, a first side member 36 and a second side member 38. The top support member 32 and the bottom support member 34 each extend relatively horizontally in a cross-car direction 27 and relatively parallel to each other. The first side member 36 and the second side member 38 extend relatively parallel to each other, but in a relatively vertical 28 direction. As may be understood the positioning and reinforcement member 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement member 30, such as by casting, laser welding or spot welding process, for example. Alternatively, an operable coupling may facilitate the formation of the positioning and reinforcement member 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Furthermore, the above-described components associated with the positioning and reinforcement member 30, as well as those described below, may comprise various materials, such as plastic or a metal. Additionally, the components may be formed as an over-mold having more than one material forming one or more of the components. The positioning and reinforcement member 30 or GOR member may have any suitable size and shape, and may be used, for example, to define and reinforce a grill opening 172 having any suitable size and shape. The positioning and reinforcement member 30 also includes a positioning and reinforcement structure opening 31. The various components of the positioning and reinforcement member 30 may be formed from any suitable material, including various metals, such as various steel or aluminum alloys, engineering plastics, or composite materials, or a combination thereof.

Figure 11:
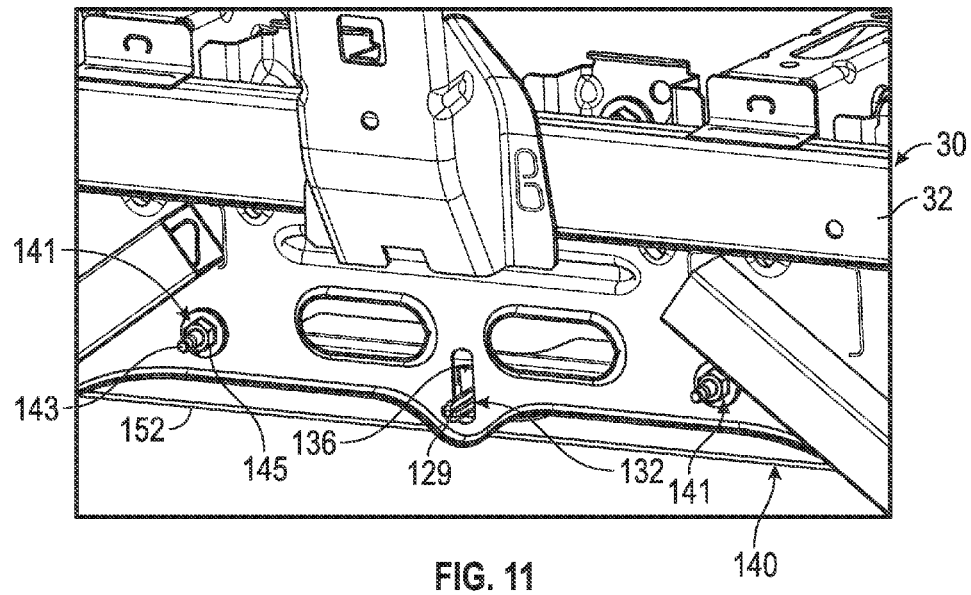
FIG. 11 is a perspective view of an embodiment of the positioning and attachment features of the top portion of the front fascia support structure 140 and positioning and support member as disclosed herein.
Figure 12:
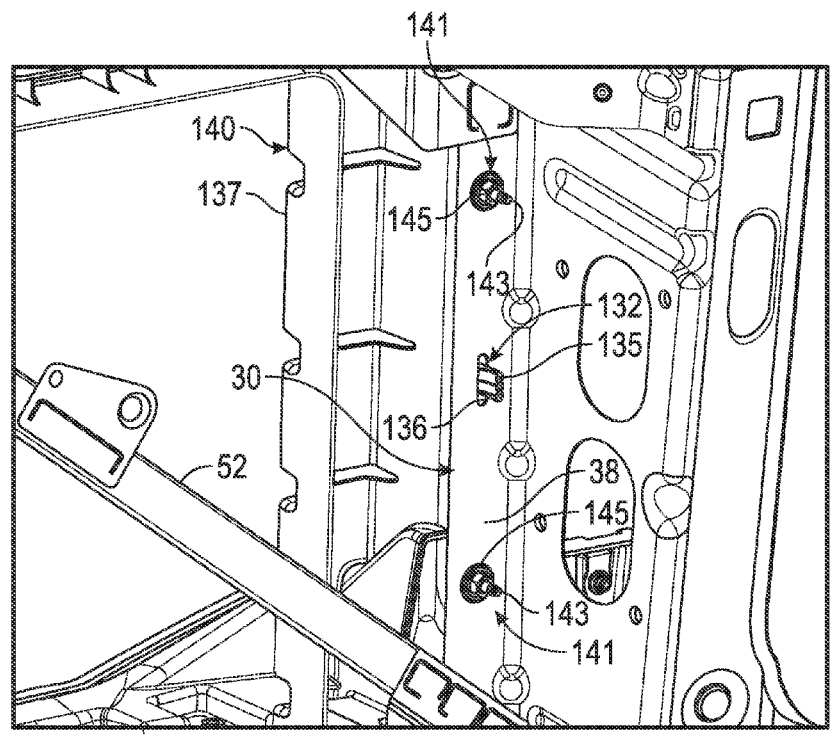
FIG. 12 is another perspective view of the positioning and attachment features of the top portion of the front fascia support structure and positioning and support member as disclosed herein.
Figure 13:
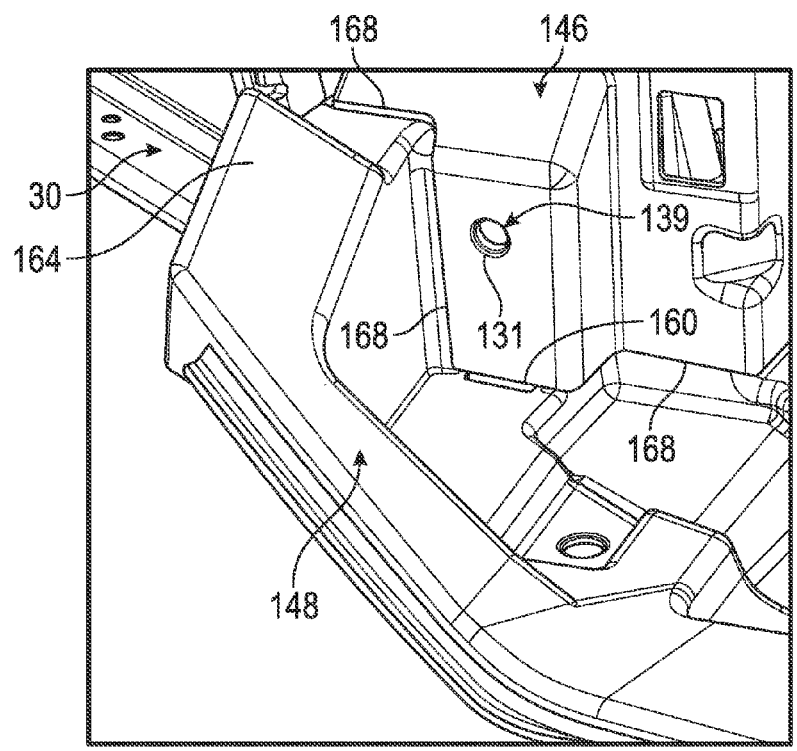
FIG. 13 is an enlarged perspective view of the top portion and bottom portion of the front fascia support structure as disclosed herein.

Referring to FIGS. 6-15, the positioning and reinforcement member 30 also includes positioning features 132 and attachment features 134 that are formed on or in the member for use in positioning and attaching the front fascia support structure 140 thereto. Any suitable positioning features 132 and attachment 134 features may be utilized. In one embodiment, the positioning features 132 include one or more, and preferably a plurality of, elongated slots 136 formed in one or more of the top support member 32, the bottom support member 34, the first side member 36 and the second side member 38. The elongated slots 136 may be oriented in any suitable direction, and in one embodiment are oriented with the length or longest portion of the slot or major dimension substantially parallel to the vertical direction 28. Referring to FIGS. 11 and 12, the slots 136, including their major dimension and width of the slot or minor dimension are sized to matingly receive molded elongated tabs 135 or pins 129, including all manner of tubular, solid cylindrical and ribbed pins) that are formed on rearward surface 137 of the front fascia support structure 140. The insertion of the mating elongated tabs 135 into the slots 136 positions the front fascia support structure 140 to the datum reference of the positioning and reinforcement member 30 in the cross-car direction 27 and the vertical direction 28. The forward surface 138, FIG. 6, of the positioning and reinforcement member 30 provides a datum reference plane that it substantially perpendicular to the axial direction 26 and seating the rearward surface 137 of the front fascia support structure 140 positions this structure fore/aft in the axial direction 26. Once the positioning and reinforcement member 30 has been positioned relative to the front fascia support structure 140 as described, they are attached to one another using at least one, and preferably a plurality of, attachment features 134 in the positioning and reinforcement member 30, such as through-holes 133, FIG. 6, and at least one, and preferably a plurality of, attachment features 139 in the front fascia support structure 140, such as through-holes 131. The plurality of attachment features 134 in the positioning and reinforcement member 30, such as through-holes 133, and plurality of, attachment features 139 in the front fascia support structure 140, such as through-holes 131 are formed on their respective members in corresponding mating patterns such that when the members are positioned as described the central axes of the holes are aligned with one another and configured to receive an attachment member 141, such as a threaded bolt 143 and nut 145.

The positioning and reinforcement member 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement member 30. Additionally, the first brace 50 and/or the second brace 52 include mounting and locating features corresponding to components integrated with, or associated with, the positioning and reinforcement member 30.

Referring again to FIGS. 1-8, and particularly FIG. 6, the positioning and reinforcement member 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement member 30 to a first fender assembly 76. The second wing structure 72 includes a second side flange 96 proximate an outermost location of the second wing structure 72 for fixing the positioning and reinforcement member 30 to a second fender assembly 98.

As indicated, the positioning and reinforcement member 30 is used to establish predetermined visual modalities by the positioning and attachment of one or more components of the front end clip or assembly 10, and preferably a plurality of the components of the front end clip, particularly those components that are directly visible, or those components that are not directly visible, but whose position directly or indirectly effects the position of components that are directly visible. The predetermined visual modalities may include positioning various components with various predetermined gaps and spacings, including three-dimensional gaps and spacings, and particularly uniform gaps and spacings.

Referring to FIGS. 1-15 in one embodiment, this includes providing a modality for establishing a predetermined position (not shown) for the front fascia 170 where it is positioned with a uniform, predetermined gap or spacing and flush appearance relative to the fender assemblies 76, 98 and hood 118 by the positioning a reinforcement member 30, particularly as it is joined to the front fascia support structure 140 and forms the position-controlled front fascia support structure assembly 142.

Figure 14:
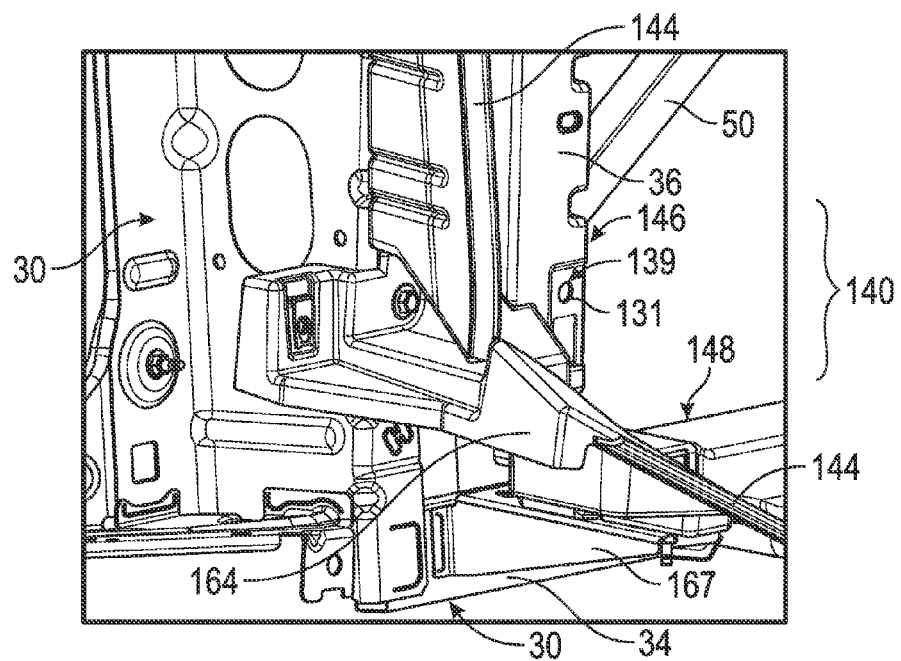
FIG. 14 is another enlarged perspective view of the top portion and bottom portion of the front fascia support structure as disclosed herein.
Figure 15:
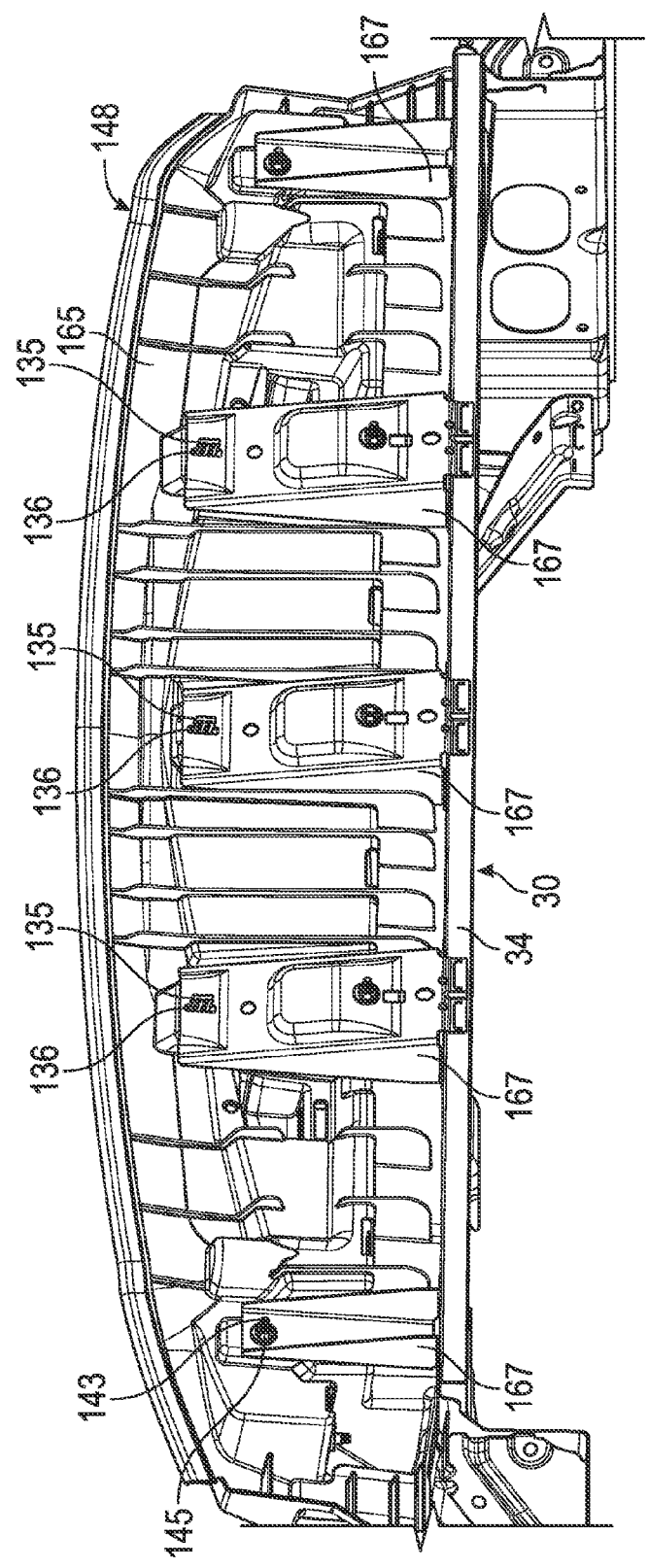
FIG. 15 is a perspective view of the positioning and attachment features of the lower portion of the front fascia support structure and positioning and support member as disclosed herein.
Figure 16:
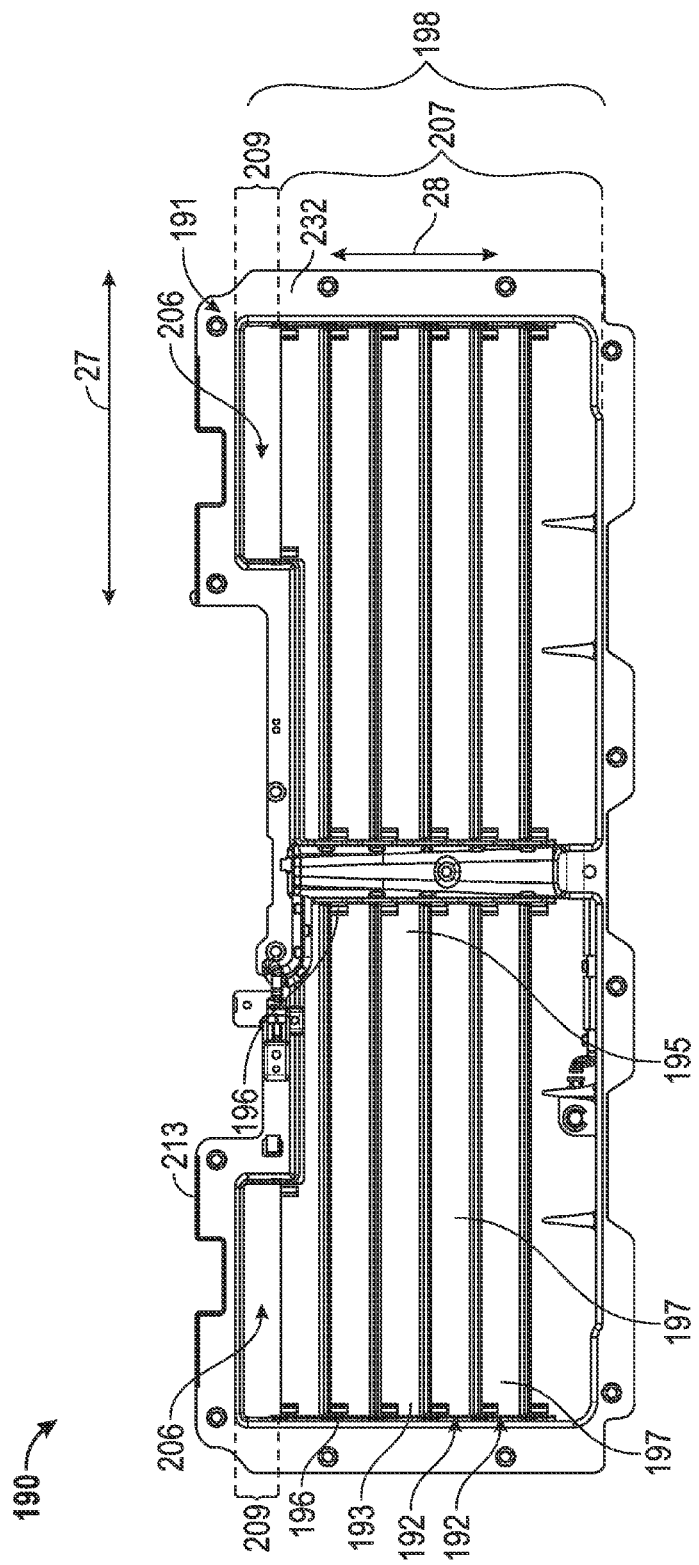
FIG. 16 is a front plan view of an embodiment of an aerodynamic shutter system as described herein.
Figure 17:
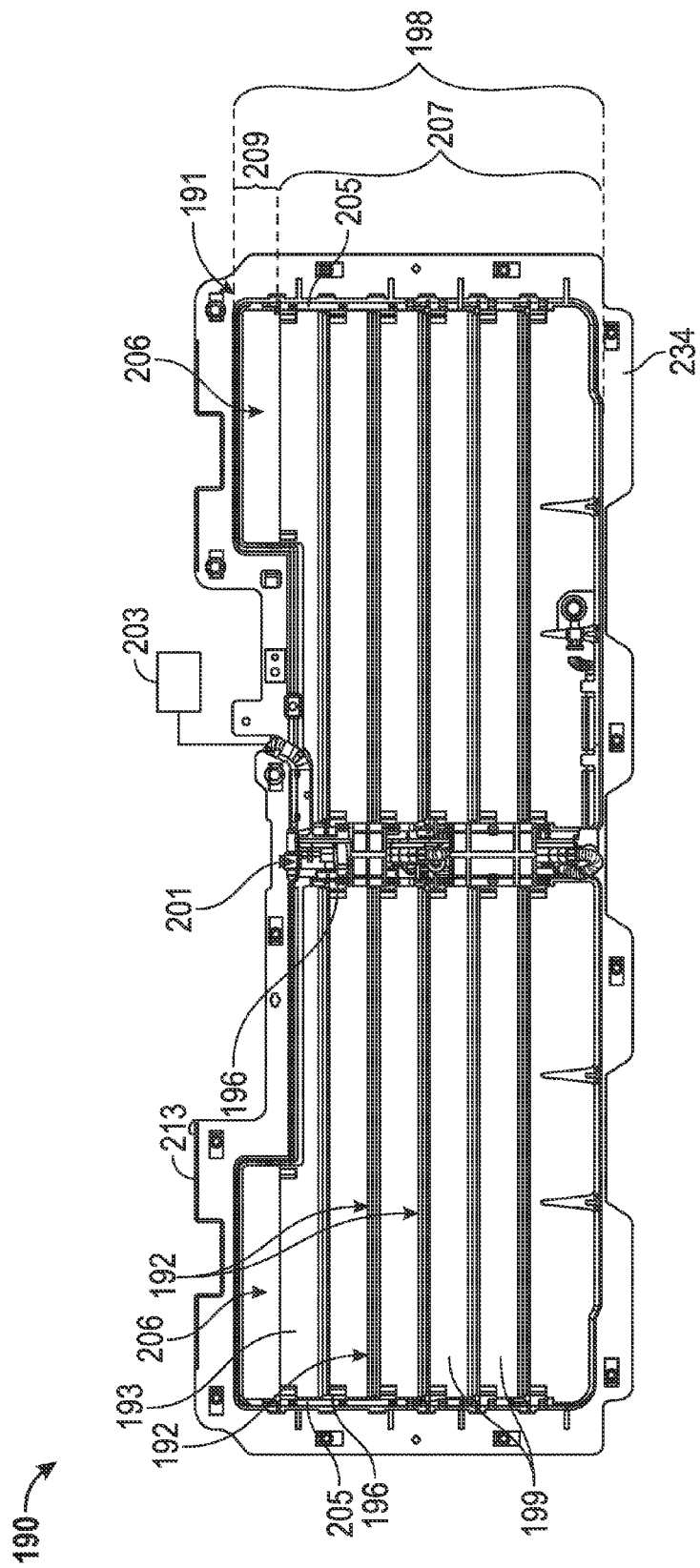
FIG. 17 is a rear plan view of the aerodynamic shutter system of FIG. 16.
Figure 18:
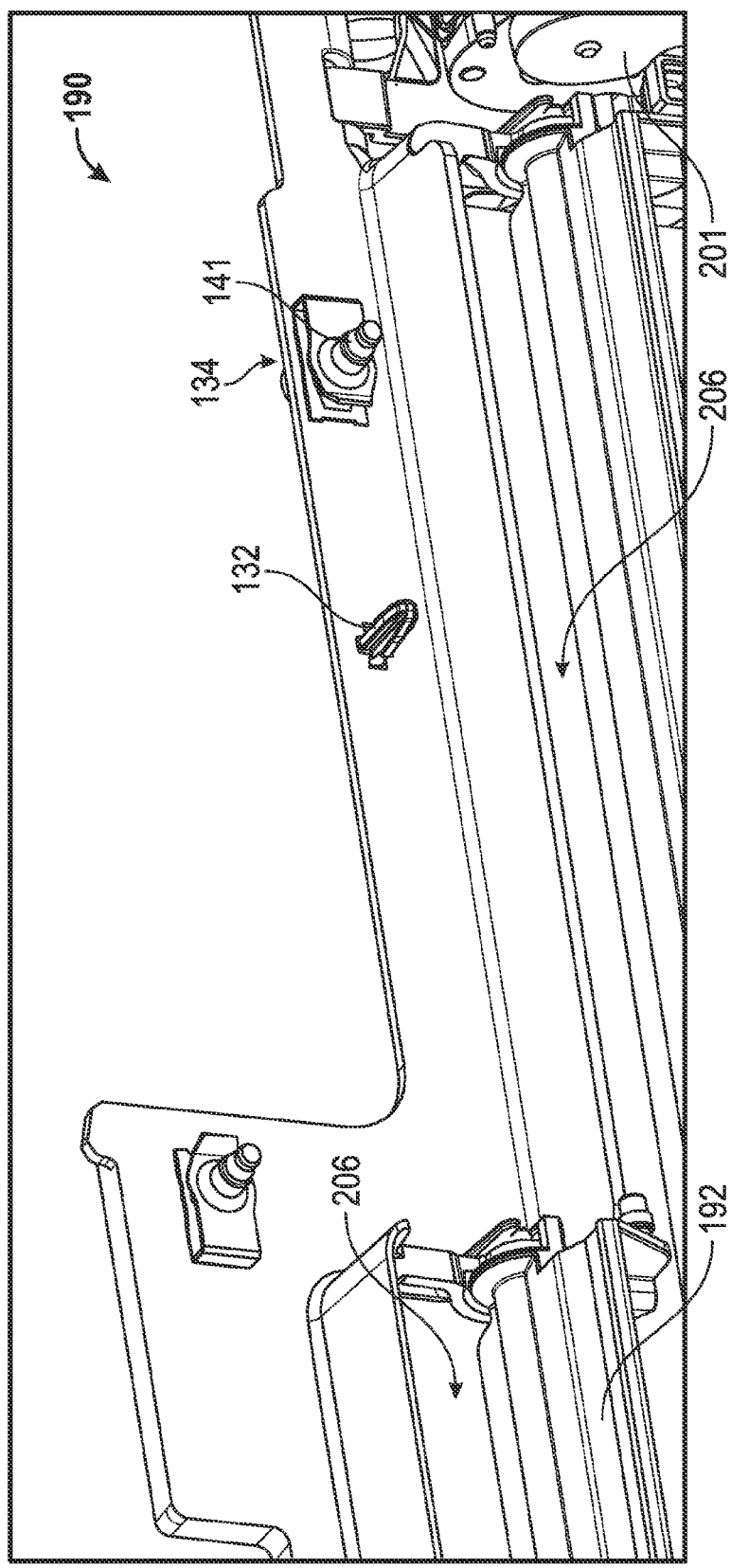
FIG. 18 is an enlarged partial rear perspective view of the aerodynamic shutter system of FIG. 16.

The front fascia support structure 140 includes a top portion 146 and a bottom portion 148. The top portion 146 comprises a substantially U-shaped body 150 comprising a top fascia support member 152, a first side fascia support member 154 and a second side fascia support member 156. The top fascia support member 152 is configured to be joined to the top support member 32 of the positioning and reinforcement member 30 as described. The first side fascia support member 154 is configured to be joined to the first side member 36 of the positioning and reinforcement member 30 as described. The second side fascia support member 156 is configured to be joined to the second side member 38 of the positioning and reinforcement member 30 as described. The bottom portion 148 may positioned with reference to the positioning and reinforcement member 30 by using the position reference features 132 in slots 136 formed in forwardly extending brackets 167 attached to the bottom support member 34 that are designed for mating engagement with the elongated tabs 135 formed on the bottom surface 165 of bottom portion 148. The bottom portion 148 is also designed to rest on, be supported by and attached to the attachment features 134 in the form of through holes 133 using threaded bolts 143 and nuts 145 as shown, for example, in FIG. 15. The first side fascia support member 154 has a first side baffle 155 that partially encloses the portion of the airflow path 178 proximate thereto. The second side fascia support member 156 has a second side baffle 157 that partially encloses the portion of the airflow path 178 proximate thereto. The top portion 146 and bottom portion 148 may be formed as separate components as shown, for example, in FIG. 6. Opposing lower ends 160 and 162 of the top portion 146 are designed to abutingly overlap the opposed ends 164, 166 of the bottom portion 148 as shown in greater detail in FIGS. 13 and 14 with respect to lower end 160 and end 164 to reduce and/or prevent portions of the airflow 100 from escaping through the interface 168 between them. The abutingly overlapped joint between them also establishes the seal members 144 of the top portion 146 in close proximity to and alignment with the seal members 144 of the bottom portion 148 as shown in FIGS. 6 and 14. Alternately, the top portion 146 and bottom portion 148 may also be formed as a single piece (not shown) having the configuration of the assembled top and bottom portions. The bottom portion 148 is attached to at least one of the plurality of position reference features 132 to establish a predetermined position of the top portion relative to the positioning and reinforcement member 30, wherein the first side baffle 155, the second side baffle 157 and bottom baffle 149 includes an airflow conduit 102 that is configured for fluid communication of an airflow 100 to and through the positioning and reinforcement structure opening 31. The airflow conduit 102, FIG. 7, comprises and is defined by the interior surfaces of the various members of the front fascia support structure assembly 142 that define an axially extending central opening 104 therein that is configured to sealingly abut either the positioning and reinforcement member opening 31 directly or another member of the assembly that sealingly abuts this opening. The use of the term "opening" herein in conjunction with the various members of the airflow conduit 102 is intended to encompass the opening referred to as well as the axially-extending surfaces associated with the periphery of the opening that act as a conduit for the portion of the airflow 100 entering therein.

The bottom portion 148 is disposed below the top portion 146 and encloses the open end of the substantially U-shaped top portion 146. The bottom portion 148 includes a bottom baffle 149 that partially encloses the portion of the airflow path 178 proximate thereto.

In one embodiment, at least one of the first side baffle 155, second side baffle 157 and/or bottom baffle 149 has a seal member 144 disposed on a leading or forwardmost edge thereof. In another embodiment, seal members 144 are disposed on the leading edge of the first side baffle or close-out panel 155, the leading edge of the second side baffle or close-out panel 157, and the leading edge of the bottom baffle or close out panel 149.

In one embodiment the top portion 146 comprises an integrally molded first polymer and the seal member 144 is disposed on the leading edge of the first side baffle 155 and the leading edge of the second side baffle 157 as an integrally co-molded second polymer, and the second polymer has a hardness that is less than the first polymer. In another embodiment, the bottom portion 148 comprises an integrally molded first polymer and the seal member 144 is disposed on the leading edge of the bottom baffle 149 as an integrally co-molded second polymer, and the second polymer has a hardness that is less than the first polymer. In one embodiment, the first polymer comprises an engineering thermoplastic or thermoset polymer, or a combination thereof, and the second polymer comprises a thermoplastic or thermoset elastomer, or a combination thereof.

Referring to FIGS. 2-5 and 16-20, in one embodiment, the position-controlled front fascia support structure assembly 142 also includes a selectively adjustable aerodynamic shutter system or assembly 190. The aerodynamic shutter system 190 may be used to control the amount of the airflow 100 entering the grill opening 172 that is allowed to pass through into the engine compartment 182. The aerodynamic shutter system 190 includes a shutter frame 191 having a shutter frame opening 206 and a plurality of rotatable shutters or louvers 192 disposed therein to define a selectively openable and closable portion 207 of the shutter frame opening and a permanently open portion 209 of the shutter frame opening 206, wherein the open portion is permanently open to receive a portion of the airflow 100 and includes no shutters to restrict or prevent the flow of air. The openable/closable portion 207 and open portion 209 may be arranged within the frame opening 206 in any configuration. In one embodiment, the open portion 209 is disposed proximate a lower end 211 of the shutter frame 191 (FIG. 2-4), for example. In another embodiment, the open portion 209 is disposed proximate an upper end 213 of the shutter frame 191 (FIGS. 16 and 17), for example.

The shutter frame 191 is a substantially cross-car extending and vertically extending shutter frame, and may have any suitable shape, including a shape that is substantially U-shaped and opens upwardly. The selectively adjustable aerodynamic shutter system 190 includes a plurality of movable (rotatable) shutters 192 that extend in the cross-car direction 27 and are configured for movement between an open position 194 (FIG. 2) where the shutters and the shutter surfaces, including front surfaces 197 and rear surfaces 199, are oriented substantially parallel to the central axis 25 of the vehicle and where the shutters are not in overlapping engagement with one another, and a closed position 198 (FIGS. 16 and 17) where the shutters and the shutter faces are oriented substantially parallel to the vertical direction 28 and where adjacent shutters are in overlapping engagement with one another. The shutters 192 may also be controlled to an intermediate position (not shown) between the open position 194 and the closed position 198 where the shutters 192 and the front and rear surfaces 197, 199 are oriented at an acute or an obtuse angle from the vertical direction 28 and direct the airflow 100 either upwardly or downwardly depending on the angle. The shutters 192 are rotatably disposed in shutter frame 191 at a first end 193 and a second end 195. The rotatable disposition may be accomplished using any suitable rotatable joint or mechanism 196 at the respective ends, such as a pin and hinge (not shown). The rotatable joints or mechanisms 196 at the first end 193 and the second end 195 may be the same joints, as shown, or different joints. In the closed position 198, the airflow 100 into the grill opening 172 is partially blocked except for the portions of the airflow 100 that pass through any permanently open portions of the selectively adjustable aerodynamic shutter system 190, such as the open portion 209. In the closed position 198 the shutters 192 restrict and reduce airflow 100 through the grill opening into the engine compartment 182. In the open position 194, the airflow 100 into the grill opening 172 is not restricted by the shutters 192. The selectively adjustable aerodynamic shutter system 190 may also be used to move the shutters 192 to various intermediate (partially open/closed) positions (not shown) between the closed position 198 and the open position 194 to meter or control the quantity or amount of the airflow 100 entering the grill opening 172.

The fascia support structure opening 104, and hence the frame opening 206, for a particular vehicle 12 may be determined and/or calculated based on two things. First, in the open position 194, these openings should provide the maximum amount of open area needed to provide a predetermined heat exchanger efficiency. The area will be determined by the size of the heat exchangers to provide a predetermined maximum amount or volume of airflow 100. In one embodiment, the opening area was as large as the frontal area of the leading heat exchanger. Second, in the closed position 198, the area of the open portion 209 will be selected to provide a base airflow 100, which is a minimum airflow needed for vehicle 12 operation, assuming that the shutters remain in the closed position 198. In one embodiment, this was accomplished by leaving a bottom rung of shutters 192 gapped or spaced from the bottom of the shutter frame 191, FIG. 2. There are several benefits for designing open portion 209 to provide a base airflow 100, including improved induction air temperature regulation, ensuring cooling for returning engine liquid heat soak in the bottom of the heat exchangers, and providing emergency airflow in the event that heavy snow, ice, or debris built up on the shutters and prevent them from opening, or in the event of a malfunction of or damage to the actuators or linkages.

The shutters 192 are selectively moveable using an actuator, such as an electric motor 201 (FIG. 17)), including various types of DC motors, and their precise position may be controlled using an electronic control module 203 (ECM). For example, the rotatable shutters 192 are operably and rotatably coupled to an electric motor 201 and movement between the open position 194 and the closed position 198 may be selectively controlled using the ECM 203. The rotatable shutters 192 may be linked together by one or more linkages 205 that interconnect the shutters 192 on one or both of their front surfaces 197 or rear surfaces 199. The linkages allow the linked shutters 192 to be rotated together by the same amount of rotation. The shutters 192 may have any suitable size, including a predetermined length, thickness and width necessary or desirable to close the desired portion of the grill opening 172. The selectively adjustable aerodynamic shutter system 190, including the frame 191 and the shutters 192, may be made from any suitable material, including a various thermoset polymers, thermoplastic polymers, metals, or composites materials, or a combination thereof. The rear surface 208 of the shutter frame 191 of the selectively adjustable aerodynamic shutter system 190 is covering and detachably attached to the top portion 146 and the bottom portion 148 of the position-controlled front fascia support structure 140 about a periphery of the fascia support structure opening 104 and may, for example, be mounted (FIG. 2) to the shutter mounting surface 210 of the position-controlled front fascia support structure 140 using threaded bolts and nuts (not shown), such as those used to attach the positioning and reinforcement member 30 to the position-controlled front fascia support structure 140, FIG. 12.

The aerodynamic shutter system 190, including the shutter frame 191, shutters 192, electric motor 201, linkages 205, may be added as a vehicle build option. The position-controlled front fascia support structure assembly 142, including the positioning and reinforcement member 30 and position-controlled front fascia support structure 140, is the structural support and dimensional positioning member for the shutter frame. The structural durability, strength and stiffness requirements for the vehicle 12 and support of the fascia 170 and grill (not shown) are met by the positioning and reinforcement member 30 and position-controlled front fascia support structure 140 without the aerodynamic shutter system 190 being installed. The fact that the vehicle 12 structural requirements are met without the aerodynamic shutter system 190 advantageously simplifies its design requirements, particularly the strength and stiffness requirements of the shutter frame 191.

In one embodiment, the position-controlled front fascia support structure assembly 142 may also include a grill (not shown) disposed in the grill opening 172 of the front fascia 170. The grill generally comprises a plurality of grill louvers that may be arranged in any suitable pattern of vertically-extending or cross-car extending louvers, or a combination thereof, or as a network comprising a plurality of interconnected polygonal shape cells. The grill defines the aesthetic appearance of the front of the vehicle 10, as well as providing a cover for the grill opening 172 and the grill, particularly the grill louvers, is adapted to provide fluid communication of the airflow 100 into the conduit 102 while limiting or preventing incursion of certain foreign objects into the conduit while the vehicle 10 is being operated. The grill may be formed from any suitable material, including various metals or engineering plastics, or a combination thereof.

Figure 2:
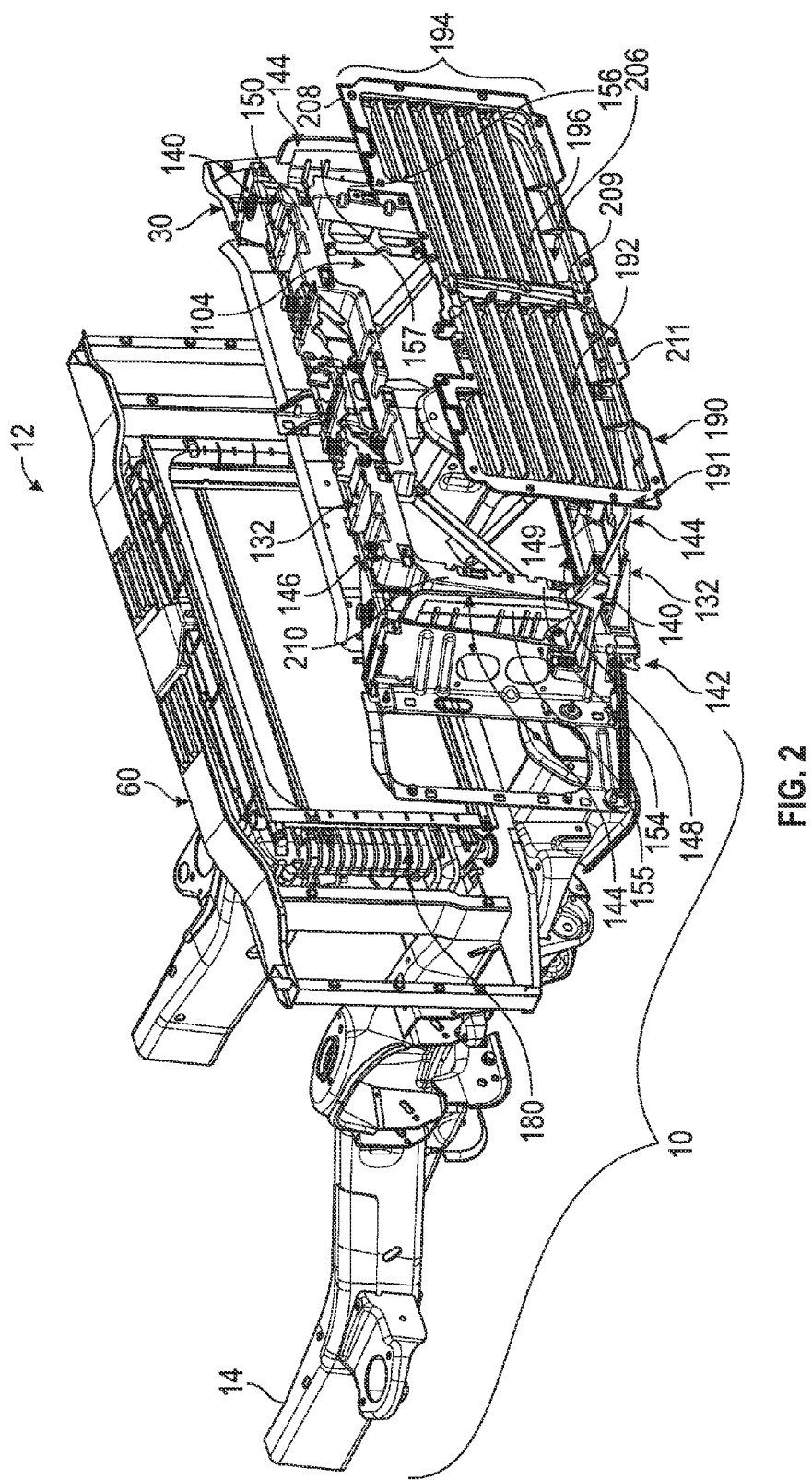
FIG. 2 is a perspective view of a partially assembled position-controlled front fascia support structure assembly as disclosed herein, wherein the radiator is attached to the radiator support and the front fascia support structure is assembled to the positioning and support structure to form an assembly thereof and an aero-shutter system that is not yet assembled thereto.
Figure 3:
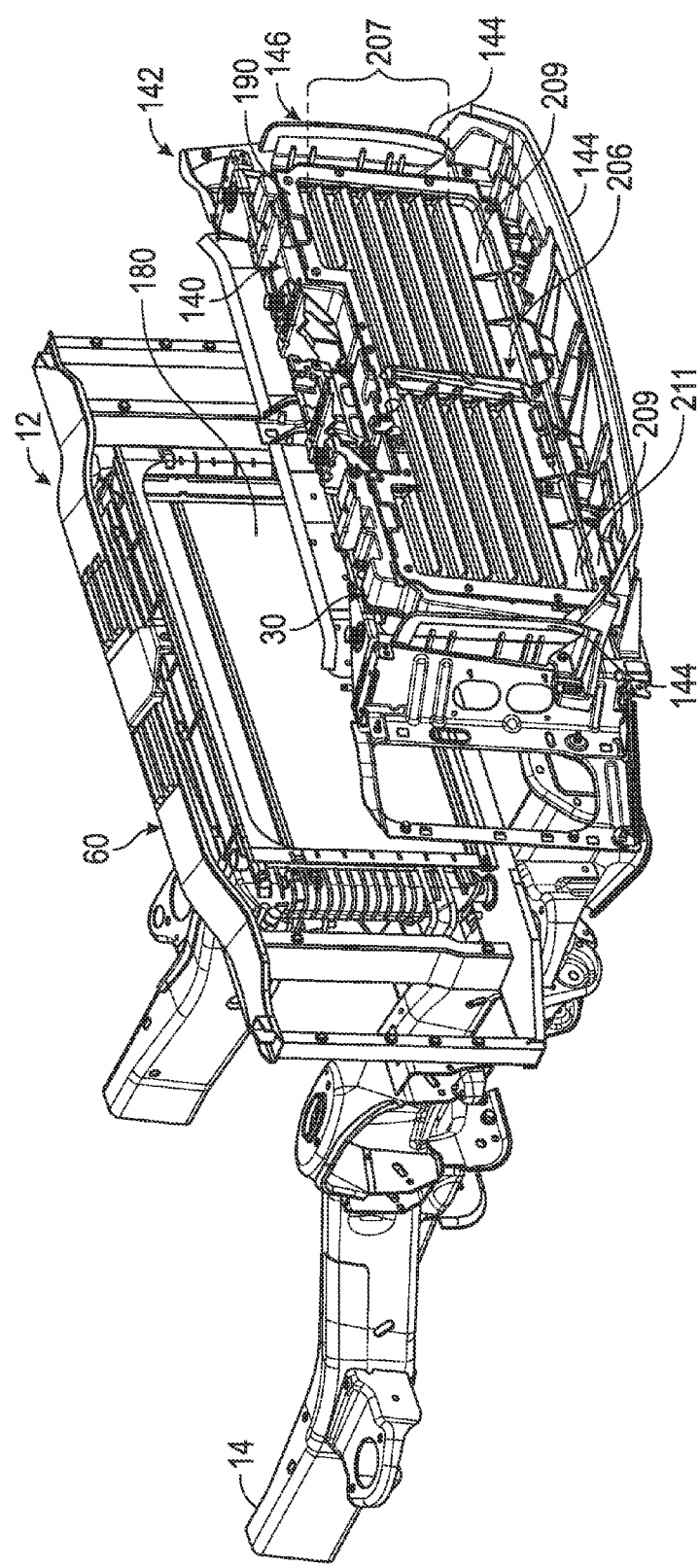
FIG. 3 is a perspective view of the position-controlled front fascia support structure assembly of FIG. 2 having the aero-shutter system further assembled thereto.

In one embodiment, the position-controlled front fascia support structure assembly 142 also includes a vehicle frame 14 and radiator support 60, wherein the positioning and reinforcement member 30 is attached to the vehicle frame and radiator support and establishes a predetermined position of the position-controlled front fascia support structure assembly 142, including the positioning and reinforcement member 30, position-controlled front fascia support structure 140, selectively adjustable aerodynamic shutter system 190 and front fascia 170 in relation to the vehicle frame 14. In one embodiment, a method of assembly of the position-controlled front fascia support structure assembly 142 is illustrated in FIGS. 2-5. The positioning and reinforcement member 30 and position-controlled front fascia support structure 140 may be positioned relative to one another in the manner described herein using the positioning features 132. The selectively adjustable aerodynamic shutter system 190 may be positioned over the position-controlled front fascia support structure 140 as shown in FIG. 2. The positioning and reinforcement member 30, position-controlled front fascia support structure 140, and selectively adjustable aerodynamic shutter system 190 may be brought into proximity and positioned relative to one another and fixed to one another as described herein and illustrated in FIG. 3 and then positioned on and fixed to the frame as illustrated in FIG. 4. The fascia 170 may then be positioned onto the position-controlled front fascia support structure 140 as illustrated in FIGS. 4 and 5.

Figure 19:
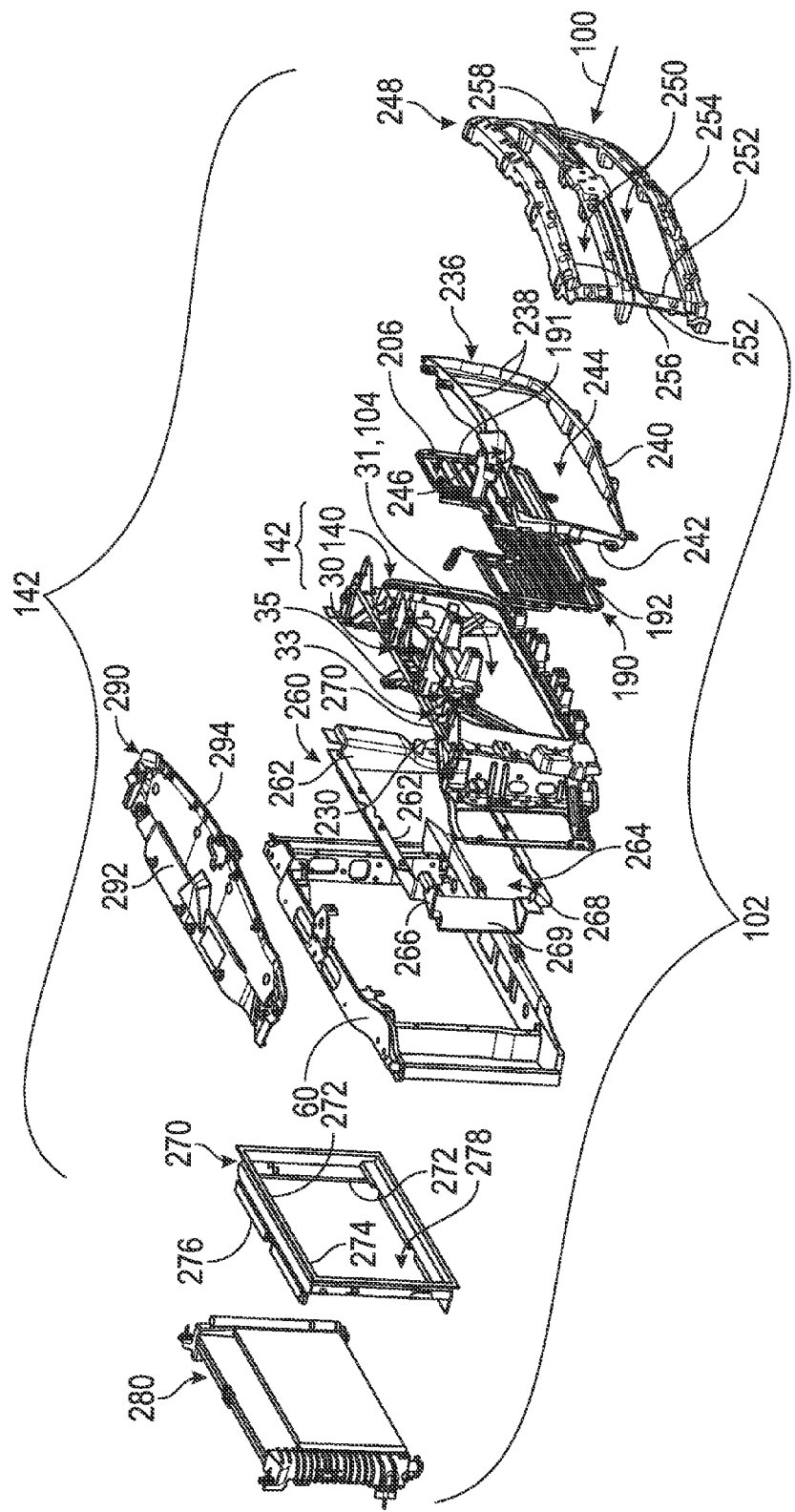
FIG. 19 is a partially disassembled perspective view of an embodiment of a position-controlled front grill support structure assembly for a vehicle as disclosed herein.
Figure 20:
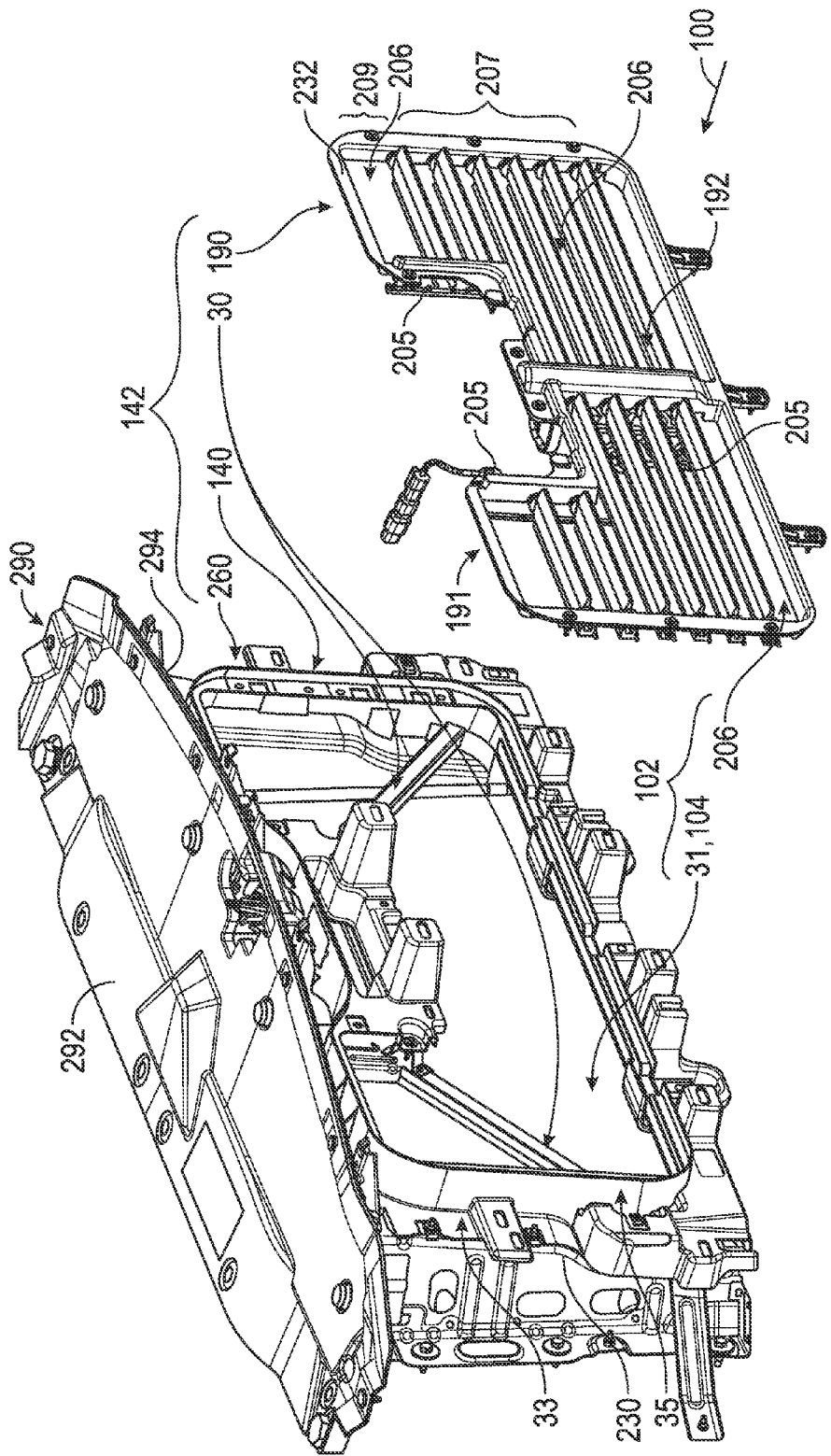
FIG. 20 is a partially assembled perspective view of a portion of the position-controlled front grill support structure assembly for a vehicle of FIG. 19.

Referring to FIGS. 1-20, and more particularly to FIGS. 19 and 20, while the aerodynamic shutter system 190 has been described above in an embodiment of a vehicle 12 that includes a position-controlled front fascia support structure 140 and front fascia 170 that surrounds and defines a grill opening 172, FIGS. 1-18, as might be used, for example, in an SUV or van, it is also applicable to other embodiments that do not employ a front fascia, including embodiments that employ a discrete grill and that include a bumper and/or trim panel that is disposed below the grill over an underlying structural front fender, for example, FIGS. 19 and 20, where the grill is not disposed within a surrounding fascia and it is desirable that the grill be positioned and supported by a position-controlled grill support structure that is analogous to the position-controlled front fascia support structure 140. For purposes of this embodiment, the same reference numbers as are used above in conjunction with the position controlled fascia support structure 140, since the position-controlled grill support structure 140 is essentially an example of a one-piece fascia support structure as described above, except that it is not used with a front fascia. In one embodiment, a position-controlled front grill support structure assembly 142 for a vehicle 12 is disclosed. The position-controlled front grill support structure assembly 142 includes a positioning and reinforcement member for a front end clip of a vehicle, the positioning and reinforcement structure comprising a substantially cross-car extending and vertically extending member frame comprising the elements described above and defining a member frame opening 31.

The position-controlled front grill support structure assembly 142 also includes a one-piece position-controlled front grill support structure 140 that is sealingly and detachably attached to the positioning and reinforcement member 30 as described herein. The position-controlled front grill support structure 140 may be described generally as comprising an attachment flange 33, and more particularly a plurality of attachment flanges 33, and a peripherally-extending grill reinforcement rib 35 extending axially outwardly away from the attachment flanges 33 in an axial direction 26. The grill reinforcement rib 35 defines a front grill support structure opening 104. The attachment flanges 33 are configured to sealingly engage a front surface 230 of the positioning and reinforcement member 30.

The position-controlled front grill support structure assembly 142 also includes an aerodynamic shutter system 190 comprising a shutter frame 191 having a shutter frame opening 206 and a plurality of rotatable shutters 192 disposed therein to define an openable/closable portion 207 of the shutter frame opening and an open portion 209 of the shutter frame opening. The shutter frame has a front surface 232, FIGS. 16 and 20, and a rear surface 234, FIG. 17. The rear surface 234 is sealingly and detachably attached to the position-controlled front grill support structure 140 about a periphery of the grill support structure opening 104. The shutters are rotatable from a closed position 198 where adjacent shutters are in overlapping engagement with one another to an open position 194 where the shutters are not in overlapping engagement with one another. The shutter frame opening 206, front grill support structure opening 104 and member frame opening 31 comprise a sealed airflow conduit 102 for communication of the airflow 100.

In one embodiment, the position-controlled front grill support structure assembly 142 also includes a grill to front grill support structure adapter 236 that includes a substantially cross-car extending and vertically extending adapter frame 238 having a front surface 240 and a rear surface 242 and defining a grill to front grill support structure adapter opening 244, the rear surface is sealingly and detachably attached as described herein to the front surface 232 of the shutter frame 191. The grill to front grill support structure adapter opening 244 also comprising a portion of the airflow conduit 102 for communication of the airflow 100 as described herein. In one embodiment, the grill to front grill support structure adapter 236 further comprises a secondary air induction inlet 246.

In one embodiment, the position-controlled front grill support structure assembly 142 also includes a front grill 248 that includes a front grill opening 250. The front grill 248 comprises a substantially cross-car extending and vertically extending grill frame 252 having a front surface 254 and a rear surface 256 and defining the grill opening 250. The grill frame 252 may also include a cross-member 258, which may include the cross-car cross-member 258 shown or a vertical cross-member (not shown). The rear surface 256 is sealingly and detachably attached to the grill to front grill support structure adapter 236. The front grill opening 250 also comprises a portion of the airflow conduit 102 for communication of the airflow 100.

In one embodiment, the position-controlled front grill support structure assembly 142 also includes a positioning and reinforcement member to heat exchanger seal adapter 260. The positioning and reinforcement member to heat exchanger seal adapter 260 includes a substantially cross-car extending and vertically extending seal adapter frame 262 having a front surface 264 and a rear surface 266 and defining a positioning and reinforcement member to heat exchanger seal adapter opening 268. The front surface 264 may be sealingly and detachably attached to a rear surface 270 of the positioning and reinforcement member 30. The positioning and reinforcement member to heat exchanger seal adapter opening 268 also comprises a portion of the airflow conduit 102 for communication of the airflow 100. In one embodiment, the positioning and reinforcement member to heat exchanger seal adapter 260 further comprises a primary air induction inlet 269 for connection to a primary air induction duct assembly (not shown).

In one embodiment, the position-controlled front grill support structure assembly 142 also includes a heat exchanger seal 270. The heat exchanger seal 270 includes a substantially cross-car extending and vertically extending seal frame 272 having a front surface 274 and a rear surface 276 and defining a heat exchanger seal opening 278. The front surface 274 may be sealingly and detachably attached to the rear surface 266 of the positioning and reinforcement member to heat exchanger seal adapter 260. The heat exchanger seal opening 278 also comprises a portion of the airflow conduit 102 for communication of the airflow 100.

In one embodiment, the position-controlled front grill support structure assembly 142 also includes a heat exchanger 280 with a plurality of heat exchanger elements and passageways, such as a plurality of spaced apart heat exchanger fins, are sealably and detachably attached to the rear surface 276 of the heat exchanger seal 270. The front grill 248 and front grill opening 250, grill to front grill support structure adapter 236 and grill to front grill support structure adapter opening 244, position-controlled grill support structure 140 and front grill support structure opening 104, positioning and reinforcement member 30 and member frame opening 31, positioning and reinforcement member to heat exchanger seal adapter 260 and positioning and reinforcement member to heat exchanger seal adapter opening 268, heat exchanger seal 270 and heat exchanger seal opening 278, and the heat exchanger 280, and the axially extending surfaces adjoining the periphery of these elements comprise the position-controlled front grill support structure assembly 142 and provide the sealed airflow conduit 102 described herein for directing an airflow 100 from the front of the vehicle 12 into the engine compartment 182 and providing the benefits and advantages described herein.

In one embodiment, the position-controlled front grill support structure assembly 142 may also include a sight shield 290. The sight shield comprises an upper surface 292 and a lower surface 294. The lower surface comprises a seal member, such as a foam panel, that extends over the lower surface 294 and that is sealably disposed above the elements of the position-controlled front grill support structure assembly 142 and air conduit 102 described above that extends axially between the grill 248 and the radiator support 60.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A position-controlled front fascia support structure assembly for a vehicle, comprising:
a positioning and reinforcement member for a front end clip of a vehicle, the positioning and reinforcement member comprising a plurality of first position reference features for locating and fixing the positions of a plurality of vehicle components comprising the front end clip, the positioning and reinforcement member comprising a positioning and reinforcement member opening; and
a position-controlled front fascia support structure detachably attached to the positioning and reinforcement member and comprising a plurality of second position reference features that are configured for cooperative engagement with the first position reference features to locate and fix the front fascia support structure in a predetermined position relative to the positioning and reinforcement member, and also comprising:
a top portion comprising a substantially U-shaped body, the U-shaped body comprising a top fascia support member, a first side fascia support member and a second side fascia support member, the first side fascia support member having a first side baffle, the second side fascia support member having a second side baffle, a second position reference feature of the top portion configured for cooperative engagement with at least one of the plurality of first position reference features to establish the predetermined position of the top portion relative to the positioning and reinforcement structure; and
a bottom portion comprising a bottom baffle, the bottom portion attached to the first side fascia support member and the second side fascia support member, the top portion and the bottom portion comprising a fascia support structure opening, at least one of the first side baffle, second side baffle or bottom baffle having a seal member disposed on a leading edge thereof, a second position reference feature of the bottom portion configured for cooperative engagement with at least one of the plurality of first position reference features to establish the predetermined position of the bottom portion relative to the positioning and reinforcement structure; and an aerodynamic shutter system comprising a shutter frame having a shutter frame opening and a plurality of rotatable shutters disposed therein to define a closable portion of the shutter frame opening and an open portion of the shutter frame opening, the shutter frame covering and detachably attached to the top portion and the bottom portion about a periphery of the fascia support structure opening, the shutters rotatable from a closed position where adjacent shutters are in overlapping engagement with one another to an open position where the shutters are not in overlapping engagement with one another.

2. The assembly of claim 1, further comprising a front fascia comprising a grill opening, the fascia sealably disposed against the plurality of seal members, wherein the grill opening, shutter frame opening, fascia support structure opening and positioning and reinforcement structure opening comprise a sealed air conduit configured for communication of an airflow from the grill opening to an engine compartment.

3. The assembly of claim 2, further comprising a grill disposed in the grill opening.

4. The position-controlled front fascia support structure assembly of claim 2, further comprising a vehicle frame, wherein the positioning and reinforcement member is attached to the vehicle frame and establishes a predetermined position of the positioning and reinforcement member, position-controlled front fascia support structure and front fascia in relation to the vehicle frame.

5. A position-controlled front grill support structure assembly for a vehicle, comprising:
  a positioning and reinforcement member for a front end clip of a vehicle, the positioning and reinforcement structure comprising a substantially cross-car extending and vertically extending member frame and defining a member frame opening;
  a one-piece position-controlled front grill support structure that is sealingly and detachably attached to the positioning and reinforcement member, the front grill support structure comprising an attachment flange and a grill reinforcement rib extending outwardly away from the attachment flange in a forward direction, the grill reinforcement rib defining a front grill support structure opening, the attachment flange configured to sealingly engage a front surface of the positioning and reinforcement member; and
  an aerodynamic shutter system comprising a shutter frame having a shutter frame opening and a plurality of rotatable shutters disposed therein to define a closable portion of the shutter frame opening and an open portion of the shutter frame opening, the shutter frame sealingly and detachably attached to the front grill support structure about a periphery of the grill support structure opening, the shutters rotatable from a closed position to an open position, the shutter frame opening, front grill support structure opening and member frame opening comprising a sealed airflow conduit for communication of an airflow.

6. The assembly of claim 5, further comprising a grill to front grill support structure adapter comprising a substantially cross-car extending and vertically extending adapter frame having a front surface and a rear surface and defining a grill to front grill support structure adapter opening, the rear surface sealingly and detachably attached to the front surface of the shutter frame, the grill to front grill support structure adapter opening comprising the airflow conduit for communication of the airflow.

7. The assembly of claim 6, wherein the grill to front grill support structure adapter further comprises a secondary air induction inlet.

8. The assembly of claim 6, further comprising a front grill, the front grill comprising a substantially cross-car extending and vertically extending grill frame defining a grill opening and sealingly and detachably attached to the grill to front grill support structure adapter, the front grill opening comprising the airflow conduit for communication of the airflow.

9. The assembly of claim 8, further comprising a positioning and reinforcement member to heat exchanger seal adapter comprising a substantially cross-car extending and vertically extending seal adapter frame defining a positioning and reinforcement member to heat exchanger seal adapter opening, and sealingly and detachably attached to the positioning and reinforcement member, the positioning and reinforcement member to heat exchanger seal adapter opening comprising the airflow conduit for communication of the airflow.

10. The assembly of claim 9, wherein the positioning and reinforcement member to heat exchanger seal adapter further comprises a primary air induction inlet.

11. The assembly of claim 9, further comprising a heat exchanger seal comprising a substantially cross-car extending and vertically extending seal frame having and defining a heat exchanger seal opening, and detachably attached to the positioning and reinforcement member to heat exchanger seal adapter, the heat exchanger seal opening comprising the airflow conduit for communication of the airflow.

12. The assembly of claim 11, further comprising a heat exchanger sealably and detachably attached to the heat exchanger seal.

13. The assembly of claim 11, further comprising a sight shield comprising an upper surface and a lower surface, the lower surface comprising a seal member, the seal member sealably disposed above the air conduit between the grill and a radiator support.

\* \* \* \* \*